Oct. 25, 1938.  C. T. FOSS  2,134,118
STOCK QUOTATION MONITORING AND AUTOMATIC SHELF SELECTION SYSTEM
Filed Dec. 31, 1930  11 Sheets-Sheet 2

INVENTOR
CLIFTON T. FOSS
BY R.C. Hapgood
ATTORNEY

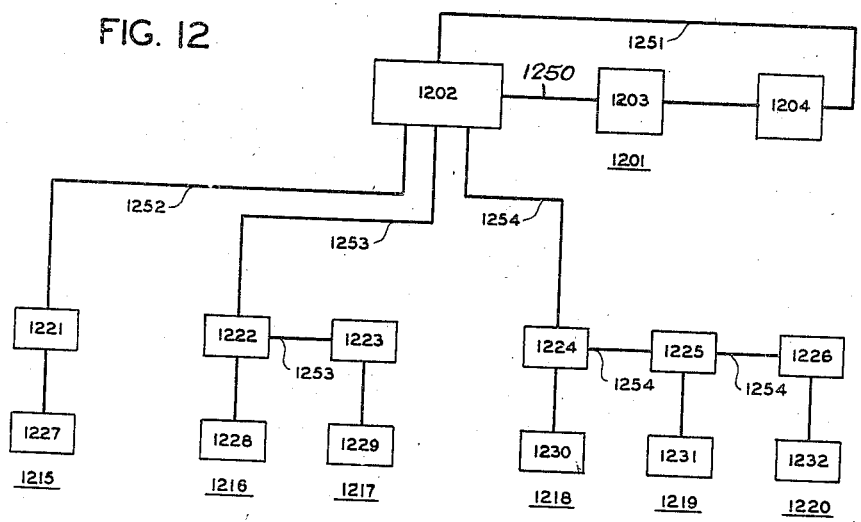
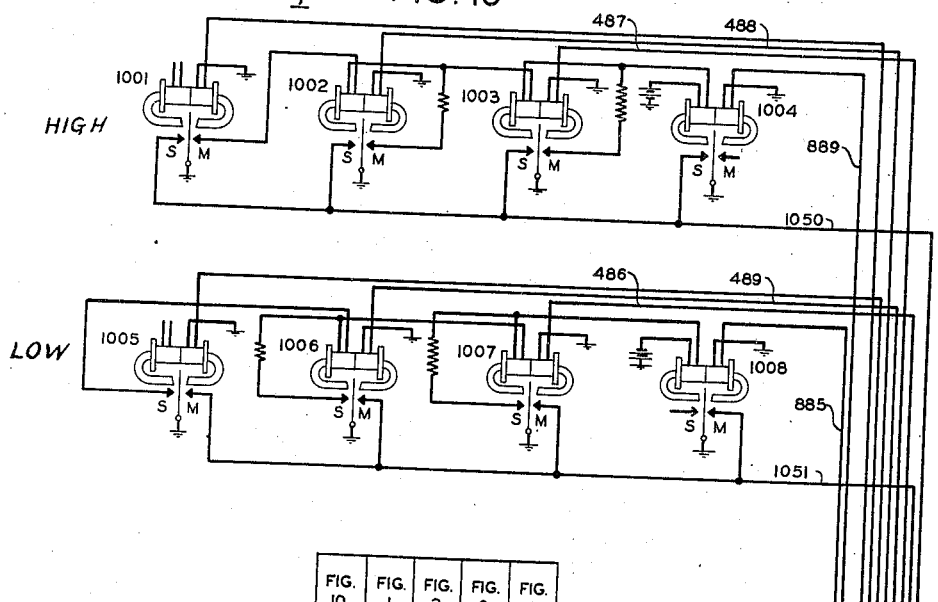

Oct. 25, 1938.  C. T. FOSS  2,134,118
STOCK QUOTATION MONITORING AND AUTOMATIC SHELF SELECTION SYSTEM
Filed Dec. 31, 1930  11 Sheets-Sheet 11

INVENTOR
CLIFTON T. FOSS
BY R.C. Hopgood
ATTORNEY

Patented Oct. 25, 1938

2,134,118

UNITED STATES PATENT OFFICE 2,134,118

STOCK QUOTATION MONITORING AND AUTOMATIC SHELF SELECTION SYSTEM

Clifton T. Foss, New York, N. Y., assignor, by mesne assignments, to International Standard Electric Corporation, New York, N. Y., a corporation of Delaware Application December 31, 1930, Serial No. 505,782

20 Claims. (Cl. 177—353)

This invention relates generally to stock or commodity quotation posting systems, and more particularly it relates to such systems wherein a number of quotation boards, located at an equal number of receiving stations, are remotely controlled from a central station.

The present invention is an improvement upon a copending application, Serial No. 495,370, filed on November 30, 1930, in the names of A. A. Clokey and G. S. Vernam. The co-pending application discloses a plurality of quotation boards, located at an equal number of receiving stations whereon quotations are automatically posted in response to signals transmitted from a central station. On these boards the indicator mechanism for each stock is provided with an open, a high, low and last shelf, each having four indicators mounted thereon, for displaying the open, high, low and last quotations, respectively, of the stock. In order to select the indicators on one or more of these shelves in a particular indicating mechanism, shelf indicating signals are transmitted by a sending operator at the central station. As the ticker tape, from which the quotations to be transmitted are obtained, does not indicate whether the quotations are new highs or new lows, it is necessary that the tape be edited before it reaches the sending operator, that is, an indication must be made thereon whether a quotation is a new high or a new low. The sending operator then transmits the shelf selection signals for a particular quotation in accordance with the indication on the edited tape. If, for example, it is indicated that a quotation is a new high, he transmits a high shelf selection signal, and if it has been indicated that a quotation is a new low, he transmits a low shelf selection signal.

Since the editing of the ticker tape ordinarily requires the services of several persons, and even then the possibility of error in indicating the proper shelf selection is always present, it is evident that this method of shelf selection which requires the sending operator to transmit a shelf selecting signal whenever a new high or low quotation is to be posted, possesses some disadvantages.

The principal object of the present invention is to eliminate the necessity of editing the ticker tape before it reaches the sending operator by providing automatic high and low shelf selection which does not require the transmission by this operator of special high and low shelf selecting signals.

In carrying out this object each of the receiving stations is provided with a receiving quotation board, similar to the board disclosed in the above-mentioned co-pending application, while the central station is provided with a master board and with a transmitter for controlling the operation of the master board, as well as the operation of all of the receiving boards.

The master board is provided with price comparison means and with shelf selecting means controlled thereby. The price comparison means serve to compare the price of a quotation to be posted with the previous high and low prices on the same stock and to selectively control the shelf selecting means in accordance with the results of this comparison. The shelf selecting means serve, under certain conditions, to alter the connections to the transmitter prior to the transmission of one of a group of prepared signals. This signal, which is called a start signal, is always prepared regardless of the quotation to be posted.

If the quotation to be posted is found to be a new high, a connection to the transmitter is altered by the shelf selecting means in such a way that instead of the prepared start signal, a high shelf selecting signal is transmitted; if the quotation to be posted is found to be a new low, another connection to the transmitter is altered by the shelf selecting means in such a way that instead of the prepared start signal a low shelf selecting signal is transmitted; and if the quotation to be posted is a last quotation only, that is neither a new high nor a new low, the connections to the transmitter remain unaltered and the prepared start signal is transmitted unmodified. If the quotation to be posted is an opening quotation, an open shelf selecting signal is transmitted prior to the start signal. As this signal serves to select all of the shelves in the indicating mechanism for the selected stock, it is immaterial whether the start signal is modified or not.

After the transmission of the start signal as altered, means are provided for releasing the shelf selecting means in order to insure the proper shelf selection when the comparison means compares the next quotation to be posted with the previous high and low quotations on the same stock.

The system outlined above is disclosed and described with reference to the accompanying drawings wherein the first figure of any reference character (the first two figures if the reference character contains four figures) is always the same as the number of the figure on which it first appears.

Figure 10 illustrates the shelf selecting polar relays for altering the connections to the transmitter of Fig. 1.

Figure 12 is a schematic diagram of the connection between the transmitter and the master board and the receiving boards.

Figure 13 shows the manner in which the various figures must be assembled in order to illustrate the complete system.

In the description to follow the parts of the system will be described in the following order; the structure of a typical indicating mechanism of the master board for indicating quotations on a particular stock; the transmitter and the associated permutation unit for controlling the stock and the price selecting means; the means for selecting a predetermined indicating mechanism adapted to indicate quotations on a particular stock, the means for selecting predetermined indicators on the last shelf of the selected indicating mechanism, the means for selecting corresponding indicators on the remaining shelves, and the means for setting the selected indicators to predetermined positions.

Figure 8:
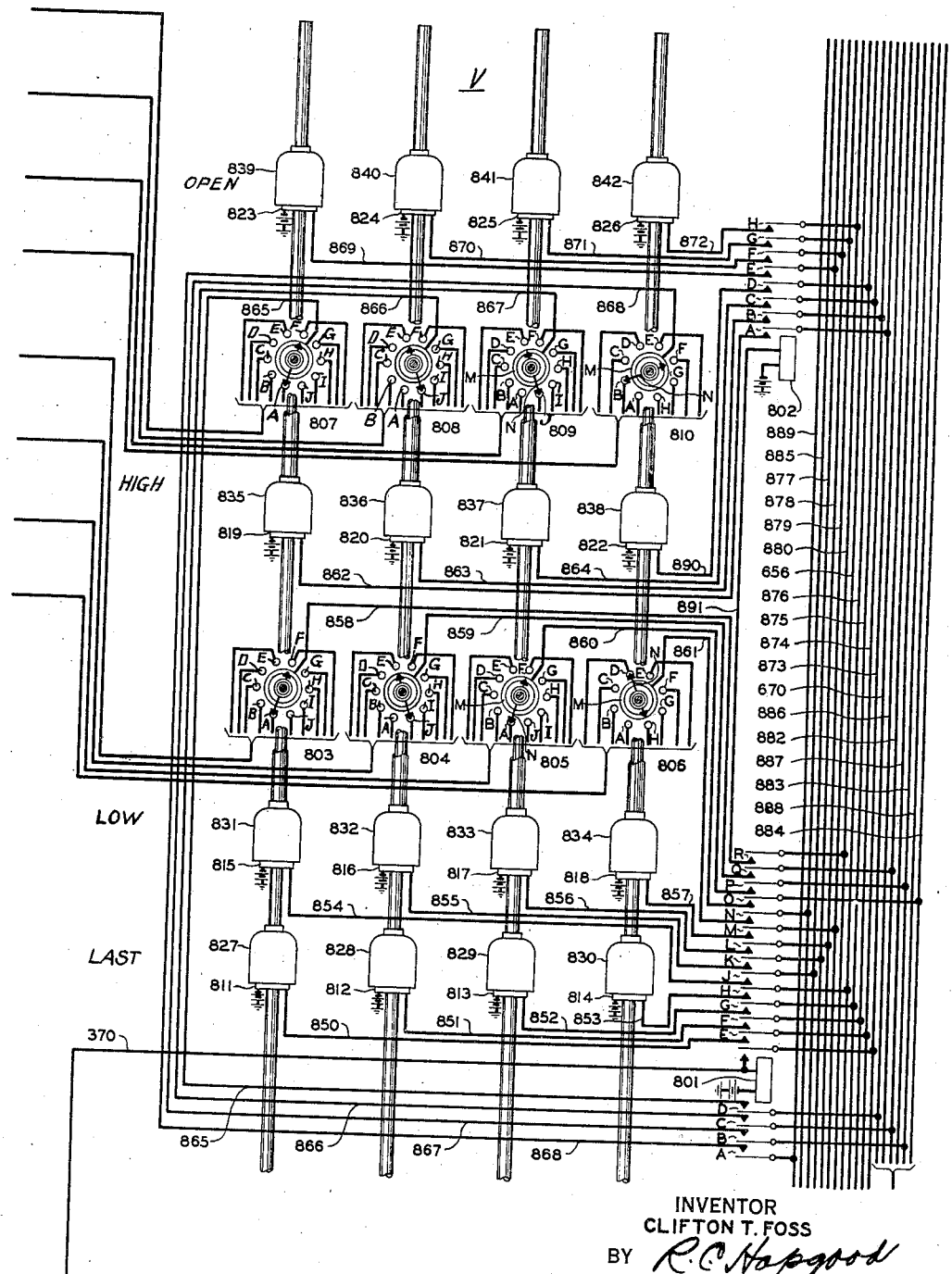
Figure 8 illustrates the indicating mechanism for a single stock.

Figure 8 illustrates schematically the indicator mechanism for indicating quotations on a single stock. In actual practice as many indicating mechanisms would be employed as there are stocks on which quotations are to be quoted or indicated. The indicating mechanism for any stock can be operated independently of the indicating mechanism for the other stocks, though as will be described later, the indicating mechanisms for the several stocks are operated from the same transmitting device.

As all of the indicating mechanisms are similar to the one shown in Fig. 8, a description of this will serve for all. The indicating mechanism is divided into four shelves, an open, high, low and a last shelf, on each of which are placed four indicators. On each shelf, one of the indicators is adapted to indicate the hundreds digit of the quotation, another the tens digit, a third the units digit and the last the fraction. For example, on the last shelf, 827, 828, 829 and 830 are adapted to indicate the hundreds, tens, units, digits and the fraction, respectively, of the quotations of the stock corresponding to this indicating mechanism.

The indicators on each shelf are arranged side by side, and in practice, all of the indicators are arranged behind a board or partition (not shown) which has openings therein through which a portion of the periphery of each of the indicators is visible. On the peripheries of the hundreds, tens and units indicators appear the figures 0 and 1–9, and on the fractions indicators appear the quantities 0 and 1/8–7/8. Whenever a quotation is to be posted the transmitting device sets in operation the selecting mechanism and the indicator operating mechanism, to be described later, with the result that predetermined indicators on the last shelf and corresponding indicators on any of the other shelves selected are turned until the quotation to be indicated is visible through the openings in the partition (not shown).

Corresponding indicators on the several shelves are mounted on one of four shafts 732–35. For example, the hundreds indicators 827, 831, 835 on the last, low, high and open shelves, respectively, are mounted on shaft 732. Similarly, corresponding tens indicators on the several shelves are mounted on shaft 733, corresponding units indicators on shaft 734, and corresponding fractions indicators on shaft 735. These shafts are adapted to be continuously driven through shaft 730 by a motor 731.

Associated with the indicators 835–38 on the high shelf are rotary switches 807–10, respectively, and associated with the indicators 831–834 on the low shelf are rotary switches 803–6, respectively. Also associated with shafts 732–35 are commutators 710–713, respectively.

Figure 11:
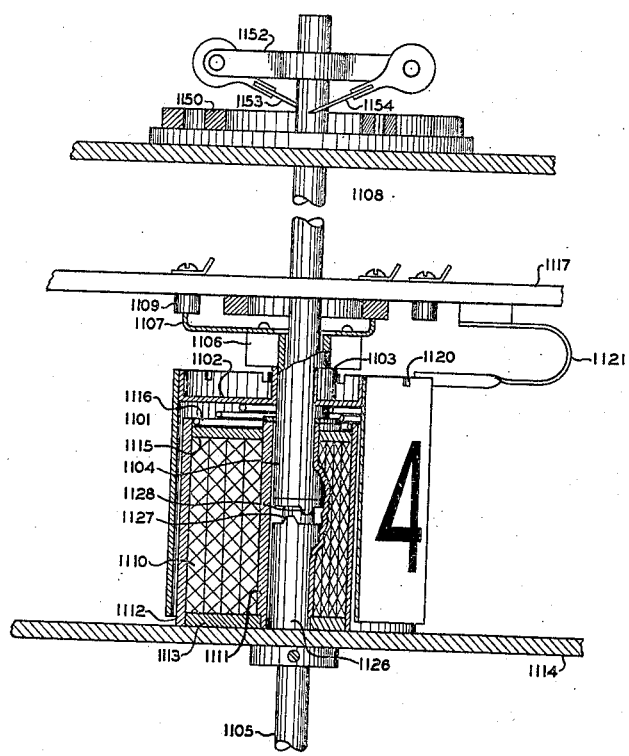
Figure 11 illustrates the details of construction of an indicator of the high or the low shelf.

The construction of the indicators, the rotary switches, and the commutators will now be explained by reference to Fig. 11. This figure shows the combined indicator and rotary switch that is used for the high and low shelves of the indicating mechanism, together with an associated commutator. The indicator drum 1101 is a thin aluminum cylinder about 1½″ in diameter and 1 3/16″ long, which carries the numerals 0 and 1 to 9 on its periphery if the indicator is a digit indicator, and the quantities 0 and 1/8–7/8 if the indicator is a fractions indicator. The aluminum cylinder is attached at the top to a sheet iron disc 1102. Disc 1102 carries a flange 1103 into which is inserted a bronze tube 1104. Tube 1104 carries at its upper extremity a disc 1106 of insulation material to which is attached a wiper 1107 co-operating with one of the rotary switches previously mentioned. A vertical shaft 1105 arranged for continuous rotation extends through tube 1104 without touching it. Sheet iron disc 1102 is the armature of an iron-clad electromagnet comprising coil 1110, the core of which is a split iron tube 1111. It is to be noted that core 1110 and the outer portion of tube 1111 are cut away at the right-hand section in order to show shaft 1105 and other portions of the mechanism more clearly.

The magnetic circuit consists of a split iron tube 1112 surrounding the coil and an iron disc 1113 at the bottom of the coil. The entire magnet comprising coil 1110, core 1111, casing 1112, and disc 1113 is supported by an external support 1114 through which shaft 1105 extends. Indicator drum and the wiper 1107 of the rotary switch are thus free to rotate and to move vertically. Their vertical travel is limited by stops to be described later.

Inserted above coil 1110 between tubes 1111 and 1112 is a fibre piece 1115 on which rests a spiral spring 1116 which presses upwards and against disc 1102 and thus tends to move the disc, the indicator drum 1101 and wiper 1107 of the rotary switch upward. Around the upper edges of drum 1101 and the flange of disc 1102 are the uniformly spaced slots, as 1120. A stop spring 1121 mounted on a fixed support engages these slots to prevent rotation of the indicator drum 1101 when it is in the upper position. When the magnet 1110, hereafter called the indicator clutch magnet, is energized, the drum is drawn downward and the slots clear the stop spring 1121 freeing the indicator drum 1101 and the associated wiper 1107 for rotation.

A steel tube hub 1126 having a hub extends through the magnet support 1114 and the lower part of magnet core 1111. This hub is attached to shaft 1105 and rotates with it. A tooth 1127 is formed on the upper edge of hub 1126 and is adapted to engage a similarly shaped tooth 1128 on the lower edge of the central bronze tube 1104. The rotary switch consists of the wiper 1107, which rotates in a plane perpendicular to the axis of the shaft 1105, a common ring 1108 and a number of contacts, as 1109. One end of the wiper is adapted to make contact with the common ring and the other end to make contact with any one of the contacts, as 1109. If the indicator is to be used in either the hundreds, tens or units position, the associated rotary switch is provided with ten contacts, as 1109, each corresponding to one of the ten digits on the periphery of the drum 1101, while if the indicator is to be used in the fractions position, the associated rotary switch is provided with eight contacts, as 1109, each corresponding to one of the 8 quantities on the periphery of drum 1101. These contacts are mounted in a strip of insulation material 1117 which is externally supported and maintained in a fixed position.

When the indicator clutch magnet 1110 is energized the indicator drum 1101 is attracted to vertically align teeth 1127 and 1128 after which tooth 1127 strikes tooth 1128 and causes rotation of indicator drum 1101 and the associated wiper 1107 of the rotary switch. When the circuit of the clutch magnet is broken in a manner that will be described later, the indicator drum 1101 is released, and tooth 1128 moved out of engagement with tooth 1127. When this occurs, as previously explained, the stop 1121 engaging one of the slots as 1120, causes the indicator drum 1101 to stop in the position of release. Likewise when the indicator clutch magnet 1110 is energized, and the drum 1101 moved downwards, wiper 1107 is moved away from contacts, as 1109, and rotated, and when the clutch magnet is again de-energized the wiper 1107 will move upwards, thus completing a connection from one of the contacts, as 1109, to the common ring 1108.

As previously mentioned, corresponding indicators on the several shelves, that is, indicators adapted to indicate the same orders of figures, are arranged to be driven by the same shaft. For example, the hundreds indicators are adapted to be driven by shaft 732, the tens indicators by shaft 733, the units indicators by shaft 734, and the fractions indicators by shaft 735. Each of these shafts has associated therewith, as previously stated, an individual commutator whose construction will now be described by reference to Fig. 11. This commutator consists of a common ring 1150 arranged concentrically within a ring of segments, as 1151. The outer segments are ten in number on commutators 710-12 inclusive, and eight in number on commutator 713. Mounted on the shaft 1105 is an arm 1152 which rotates with the shaft. Arm 1152 carries two brushes 1153 and 1154 electrically connected together. Brush arm 1152 is so mounted on the shaft 1105 as to be in phase with tooth 1127 and switch arm 1107; that is when the tooth 1127 is driving tooth 1128 and the digit 1 on the indicator drum 1101 is in the display position, brush 1153 will rest on the segment, as 1151, corresponding to the number 1 and wiper 1107 of the rotary switch will connect common ring 1108 with the contact, as 1109, corresponding to the numeral 1.

This relation can perhaps be better explained by reference to Fig. 8. In this figure, the rotary switches 807-809 and 803-805 are each provided with a wiper N one end of which is adapted to rotate over contacts A—J and the other end of which is adapted to rotate over a common ring M and the rotary switches 810 and 806 are each provided with a wiper N one end of which is adapted to rotate over contacts A—H and the other end over common ring M. Also each of the commutators 710-712 is provided with a wiper N which is likewise adapted to wipe over contacts A—J and a common ring M, and the commutator 713 is provided with a wiper N which is adapted to rotate over contacts A—H and a common ring M. Let it be assumed that the fractions indicator 834 on the low shelf is being driven, and at the time in question, the numeral ⅛ is displayed through the operture in the partition (not shown). At that time a tooth corresponding to tooth 1127 and rotating with driving shaft 735 will be in engagement with a tooth corresponding to 1128 attached to the indicator 834. It will further be assumed that contact B of commutator 713 and contact B of rotary switch 806 correspond to the numeral 1. Consequently at this time, the brush N of commutator 713 will rest on contact B and brush N of rotary switch 806, which corresponds to brush 1107 of the rotary switch of Fig. 11, will also rest on contact B and on the common ring M which corresponds to common ring 1108 of Fig. 11.

From the above description it will be understood that while any of the indicators, as 835, on either the high or the low shelf is being positively driven, the numerals displayed by the indicator at any time will correspond to the contact of rotary switch 807 on which brush N rests and to the contact of commutator 710 on which brush N rests. Hence when the clutch magnet of any indicator on the high or low shelf is released, and the indicator drum is locked in the position of release, the brush N of the associated rotary switch is brought to rest on a contact corresponding to the numeral displayed by the indicator. Also, when any of the indicators, as 827, on either the open or the last shelf, is being positively driven, the numeral displayed by that indicator at any time corresponds to the contact of the associated commutator, as 710, on which brush N then rests.

The indicators 839-842 on the open shelf, and the indicators 827-830 on the last shelf are similar to the indicator just described, except that each of the indicators on these two shelves does not have associated therewith a rotary switch.

Associated with each indicating mechanism is a stock relay 801. When operated, this relay serves to condition for selection the clutch magnets of all of the indicators and to prepare circuits which are to be subsequently extended through the rotary switches 803-6 and 807-810. Co-operating with stock relay 801 is another relay 802 which serves to condition for selection the clutch magnets of the indicators on the high and open shelves. Relay 802 connects the clutch magnet circuits of the indicators on the high shelf in multiple with the clutch magnet circuits of corresponding indicators on the last shelf, and connects the clutch magnet circuits of the indicators on the open shelf in multiple with the clutch magnet circuits of corresponding indicators on the low shelf. For example, the clutch magnet circuit of hundreds indicator 827 on the last shelf is multipled over conductor 873 to the clutch magnet circuit of the hundreds indicator 835 on the high shelf, and the clutch magnet of the hundreds indicator 831 on the low shelf is multipled over conductor 877 to the clutch magnet of the hundreds indicator 839 on the open shelf.

Before describing the means for selecting the various stock relays and also before describing the means for selecting the indicators adapted to indicate quotations on that stock, the transmitter and the associated permutation unit for controlling both of these means will be described.

Figure 1:
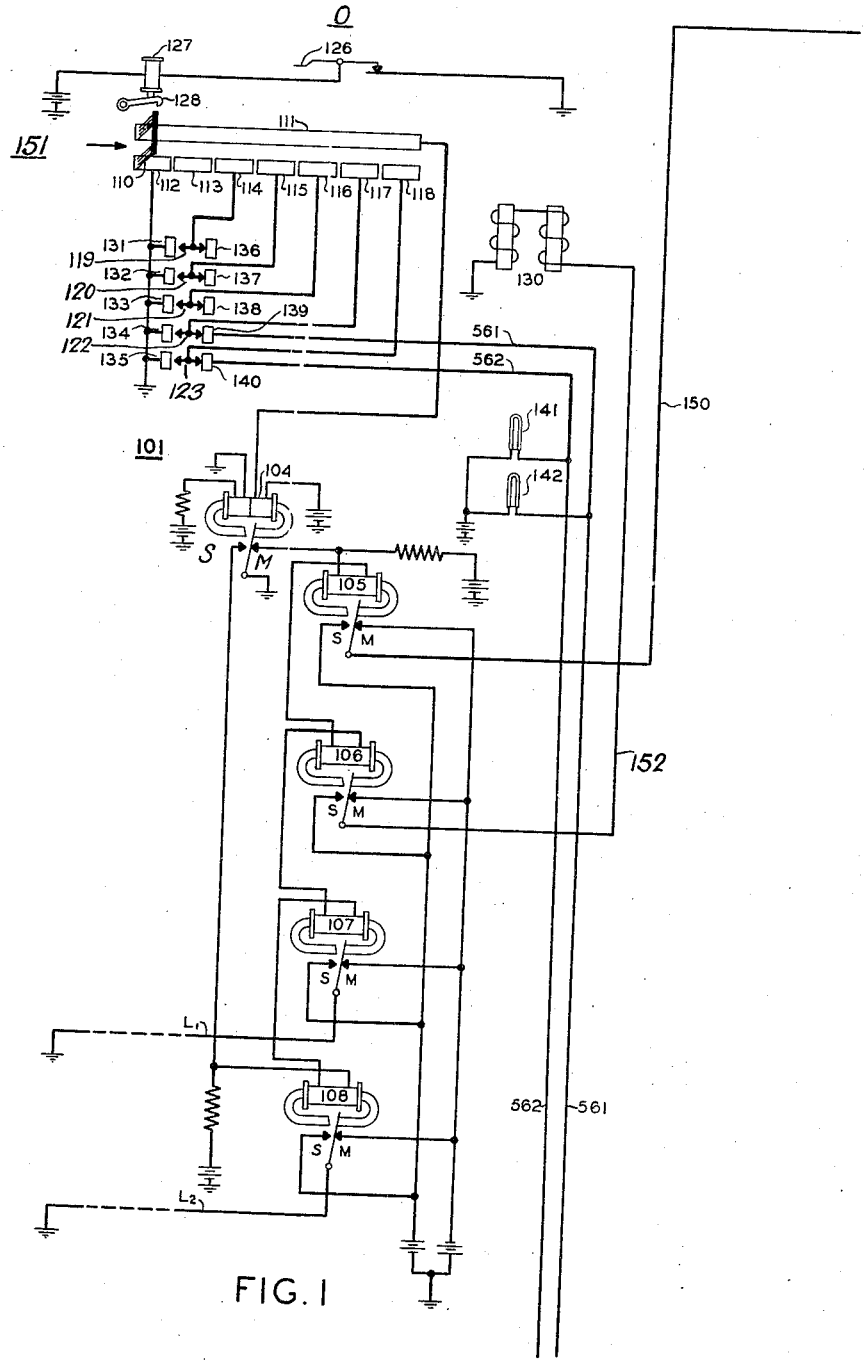
Figure 1 illustrates a transmitter, transmitting distributor and associated sending relays for controlling the operation of the master board and the receiving boards.

Referring to Fig. 1 a transmitting means O controls the operation of the master board and all of the receiving boards. The receiving boards which it is proposed to use, are similar to the quotation board disclosed in the above-mentioned co-pending application. As the structure and operation at the receiving boards may be understood by reference to the above-mentioned co-pending application, they will not be described here. It will be sufficient to point out that they are controlled by the transmitting means O over lines L1 and L2. The transmitting means O also controls the operation of the master board over conductor 150.

The transmitting means O is located at the sending operator's position. It comprises a tape sending distributor 101, a tape printer 130, a key 126, a master sending relay 104, a local record relay 106 and sending relays 105, 107 and 108.

The tape sending distributor unit 101 comprises a motor driven brush arm 110 (the motor not shown) arranged to be driven over a distributor face having a common ring 111 and a segmented ring having seven segments 112–118. The tape sending unit includes a transmitter, similar to those used for multiplex transmission, having five transmitter contacts 119–123 arranged to make contact with grounded contacts 131–135, respectively, which are connected to segment 112 of the distributor ring, or to make contact with contacts 136–140 respectively, which are connected to the segments 114–118 respectively, of the distributor ring.

The position of the transmitter contacts 119–123 depends upon the perforations in the prepared tape. Associated with each transmitter contact is a pin (not shown). If there is a perforation in the tape above this pin, it makes contact with one of the contacts 131–135; if there is no perforation above this pin, it makes contact with one of contacts 136–140. The perforated tape is stepped ahead mechanically by a cam (not shown) on the brush arm driving shaft (not shown) rather than by a magnet as is usual in multiplex transmitters. Brush arm 110 is driven through a friction clutch (not shown) and may be stopped by lifting tape stop lever 126, thus opening the circuit of the clutch magnet 127, thereby retarding stop arm 128 which brings brush arm 110 to rest on segment 112. Normally brush arm 110 rotates continuously.

The master sending relay 104 is a polarized relay and has a right-hand or operating winding and a left hand or biasing winding through which a current of approximately 30 milliamperes flows. When the operating winding is open, the biasing winding serves to hold the relay armature on the S contact, but when the operating winding is closed, the relay armature is moved to the M contact.

The sending relays 105–108 are arranged to operate in unison with the master relay, that is, when the armature of master relay 104 rests on contact M battery flows through the sending relay windings in such a direction that these relays move their contacts to their M contacts; and when the armature of relay 104 rests on its S contact, battery flows through the sending relay windings in the opposite direction, thus causing these relays to move their armatures to their S contacts.

As previously stated, the receiving boards controlled by sending relays 107 and 108 over lines L1 and L2 are similar to the boards disclosed in the previously mentioned co-pending application, and their operation will not be described here.

Sending relay 106 controls the local printer 130, thus giving the sending operator a record of the signals transmitted.

Sending relay 105 controls the master board. It is obvious that additional sending relays, also controlled by the master relay 104, might be added to control any desired number of additional receiving boards.

It is evident from the foregoing description that a perforated tape fed through the transmitter will cause the master relay 104 to be operated in accordance with the perforations in the tape, and that the sending relays 105–108 will follow the operations of the master relay.

Figure 2:
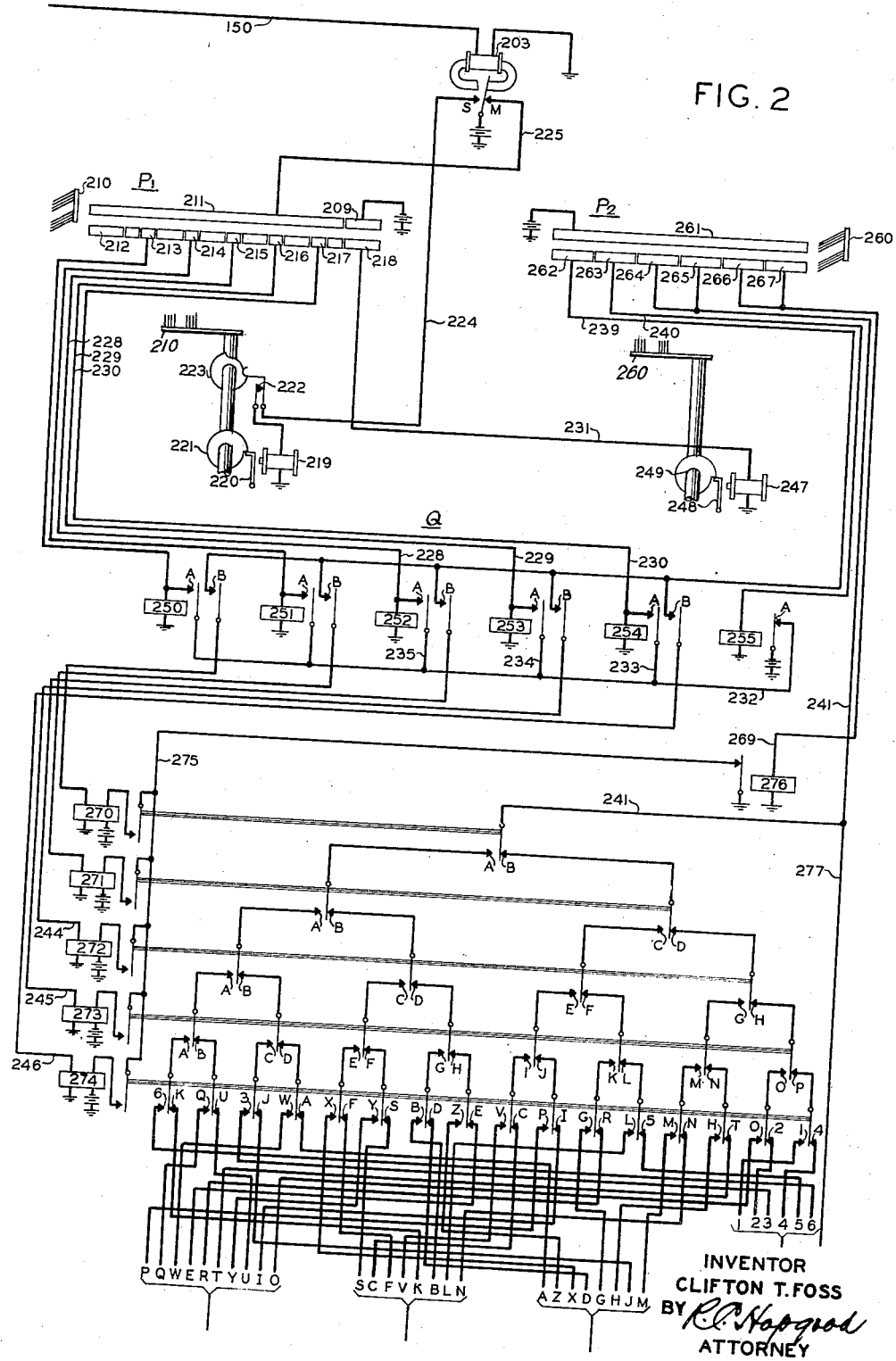
Figure 2 illustrates a receiving and an auxiliary distributor together with a permutation unit for controlling the master board.

The permutation unit Q, which is controlled by the sending relay 105, and in turn controls the master board, will now be described. Referring to Fig. 2 a receiving relay 203 is controlled over conductor 150 by sending relay 105. Associated with the relay 203 is a receiving distributor P1 and controlled by the receiving distributor is an auxiliary distributor P2. The receiving distributor P1 is maintained in synchronism with the sending distributor of Fig. 1 by the start stop method; that is, the motor driven brush arm 210 of the receiving distributor is rotated about 12% faster than the motor driven brush 110 of the sending distributor, and is arranged to be stopped at the end of one revolution and to be started at the beginning of the next revolution in phase with the transmitting brush.

Rigidly mounted on the drive shaft of brush arm 210 are cams 221 and 223. The cam 221 has a projection which is adapted to be engaged by an armature 220 of a start relay 219. When this occurs the friction clutch (not shown) is disengaged, and the brush arm 210, which is driven through the friction clutch brought to rest. When relay 203 closes its S contacts on the receipt of a start signal, start relay 219 is energized, disengaging its armature 220 from the projection on the cams, thus allowing the brush arm 210 to be driven through the friction clutch. The other cam 223 co-operating with spring contacts 222 serves to prevent any further energization of start relay 219 until after the brush arm 210 has completed this revolution.

The auxiliary distributor P2 is likewise of the start stop type. It also has associated with it a start relay 247, having an armature 248, which, in the manner previously described, co-operates with a cam 249 mounted on the drive shaft of brush arm 260 to start and stop the rotation of brush arm 260.

Associated with these two distributors is the permutation unit Q. The function of the permutation unit Q is to associate any one of four groups of conductors P—O, S—N, A—M, and 1–6 with conductor 241 which is controlled by the auxiliary distributor P2. The permutation unit comprises two groups of relays 250–255 and 270–74 and 276 which jointly control the connection of any one of the four groups of conductors to conductor 241. During each revolution of the distributor brush 210 predetermined relays in the group 250–4 are operated in accordance with received signals. The operation of any of the relays 250–4 prepares an operating circuit for a corresponding relay in group 270–4. During each revolution of the auxiliary distributor, the conditioned relays in group 270–4 are operated, and then relay 255 is operated to effect the release of the operated relays in group 250–4. The operation of predetermined relays in group 270–4 connects one of the thirty-two conductors in the four groups to conductor 241. Following this, the auxiliary distributor brush 260 connects battery to the selected conductor connected to conductor 241 and also to conductor 277, and finally completes the circuit of relay 276 which effects the release of the operated relays in group 270–4. It is thus evident that the permutation unit can be selectively operated by signals sent from the transmitting means O to select a predetermined one of the four groups of conductors, that parallel circuits including this conductor and conductor 277 can be closed and the permutator unit then released to await the reception of the next signal.

The first group of conductors P—O and the second group S—N are joint stock and price selecting circuits. The stock group A—M are stock selecting circuits only, and the fourth group 1–6 are stunt circuits whose function will be explained later.

Figure 3:
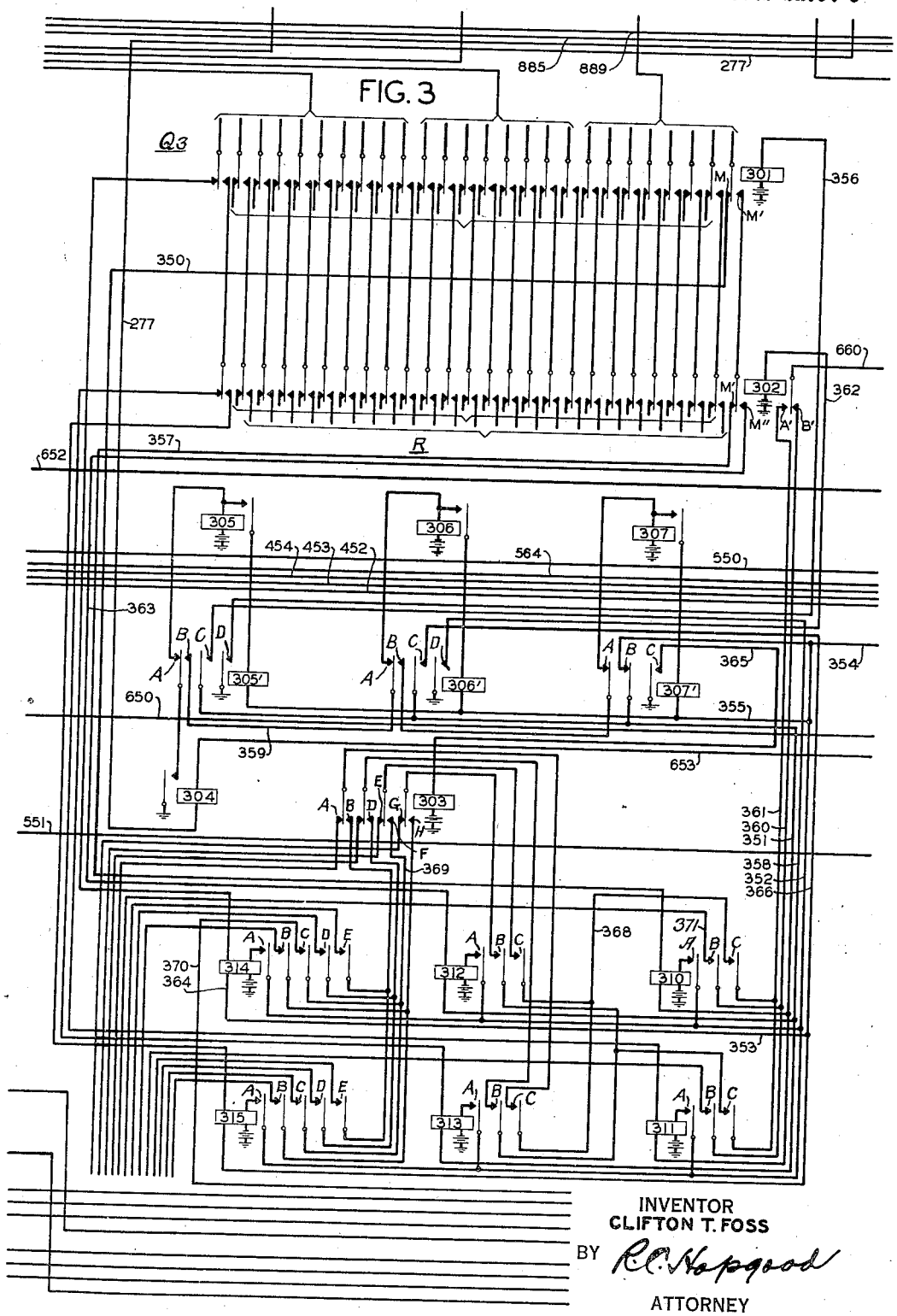
Figure 3 illustrates the stock selecting circuits of the master board.

The means for selecting the various stock relays, as 801, will now be described. At this place, it seems desirable to point out that the indicating mechanisms for the various stocks have been divided into three groups, one comprising indicating mechanisms for displaying quotations on stocks designated by one letter, another comprising indicating mechanisms for displaying quotations on stocks designated by two letters, and the last comprising indicating mechanisms for displaying quotations on stocks designated by three letters. The stock selection relays shown in Fig. 3 are likewise divided into three groups of one, two and three letter stock selection relays. The one letter group, the two letter group in co-operation with the one letter group, and the three letter group in co-operation with the one and two letter groups serve to select stock relays in the one, two and three letter groups, respectively. Each of the three groups of stock selection relays may be provided with twenty-six relays, in which case the one letter group can select any one of twenty-six stock relays, the two letter group can select any one of 676 stock relays, and the three letter group can select any one of 17,576 stock relays. As each stock relay serves to select a particular indicating mechanism, and each indicating mechanism is adapted to display quotations on a particular stock, it is evident that in this case any one of 18,278 different stocks can be selected. Since it is unnecessary in actual practice to select this large number of stocks, each of the three groups of stock selection relays would, in practice, be provided with a smaller number of relays than twenty-six.

In the drawings only two stock selection relays are shown in each group, as this number is sufficient to illustrate the stock selecting operation. Relays 310 and 311 are the M and P relays, respectively, in the one letter group, relays 312 and 313 are the M and P relays, respectively, in the two letter group, and relays 314 and 315 are the M and P relays, respectively, in the three letter group.

The three groups of conductors P—O, S—N and A—M controlled by the permutation unit A are normally connected to corresponding stock selection relays in the one letter group. For example, conductor P is normally connected to relay 311, which is the P relay in the one letter group, and conductor M is normally connected to relay 310, which is the M relay in the same group.

Since the one letter group of selection relays is normally the only group conditioned for selection, means must be provided for subsequently conditioning the stock selection relays in the two and three letter groups for selection. In other words, means must be provided for consecutively connecting the three groups of conductors P—O, S—N, and A—M controlled by the permutation unit to the stock selection relays in the second and third groups. These means comprise three pairs of counting relays 305 and 305′, 306 and 306′, 307 and 307′, a pulsing relay 304 and three transfer relays 301–303. The pulsing relay 304 which is connected to conductor 277, under control of the auxiliary distributor P2, is operated whenever a stock selection relay is energized. The pairs of counting relays serve to count the number of operations of the pulsing relay 304, which is in effect to count the number of stock selection relay groups in which a relay is selected. The first pair of counting relays 305 and 305′ is operated upon the first operation of the pulsing relay, the second pair 306 and 306′ and the third pair 307 and 307′ are successively operated upon the second and third operations of the pulsing relay. It is to be noted that when the pulsing relay operates the first relay of a pair of counting relays, as 305 in the first pair, is operated and the second relay, as 305′, conditioned for operation. The second relay does not operate at this time as both terminals of its winding are grounded, but upon the release of the pulsing relay 304 the second relay, as 305′, then energizes. The transfer relay 301, which is responsive to relay 305′, serves to connect each of the stock selection relays in the two letter group to a corresponding conductor in the first three groups controlled by the permutation unit Q. For example, conductor M is connected to relay 312 which is the M relay in the two letter group, and conductor P is connected to relay 313 which is the P relay in the same group.

The transfer relay 302, which is responsive to relay 306′, serves to connect each of the stock selection relays in the three letter group to a corresponding one of the first three groups of conductors controlled by the permutation unit Q. For example, conductor M is connected to relay 314 which is the M relay in the three letter group, and conductor P is connected to relay 315 which is the P relay in the same group. The transfer relay 303, which is responsive to relay 307′, serves a function to be presently described.

When one of the single letter stock selection relays, as 310, is operated, a stock relay associated with an indicating mechanism adapted to display quotations on a stock designated by a single letter, as M, is selected. When one of the single letter stock selection relays, as 311, and one of the two letter selection relays, as 312, are operated, a stock relay associated with an indicating mechanism adapted to display quotations on a stock designated by two letters, as PM, is selected. When one of the single letter stock selection relays, as 310, one of the two letter stock selection relays, as 312, and one of the three letter relays, as 314, are operated, a stock relay, as 801, associated with an indicating mechanism adapted to display quotations on a stock designated by three letters, as MMM, is selected. When the transfer relay 303 is de-energized, the selecting circuits for the group of two letter stock relays extend through one set of its contacts; and when this relay is energized, the selecting circuits for the group of three letter stock relays extend through another set of its contacts.

It is evident from the foregoing description that, by successively operating the permutation unit Q a stock selection relay in any one of the three stock selection groups can be selectively operated, and any stock relay in any one of three groups thereby selected.

Figure 4:
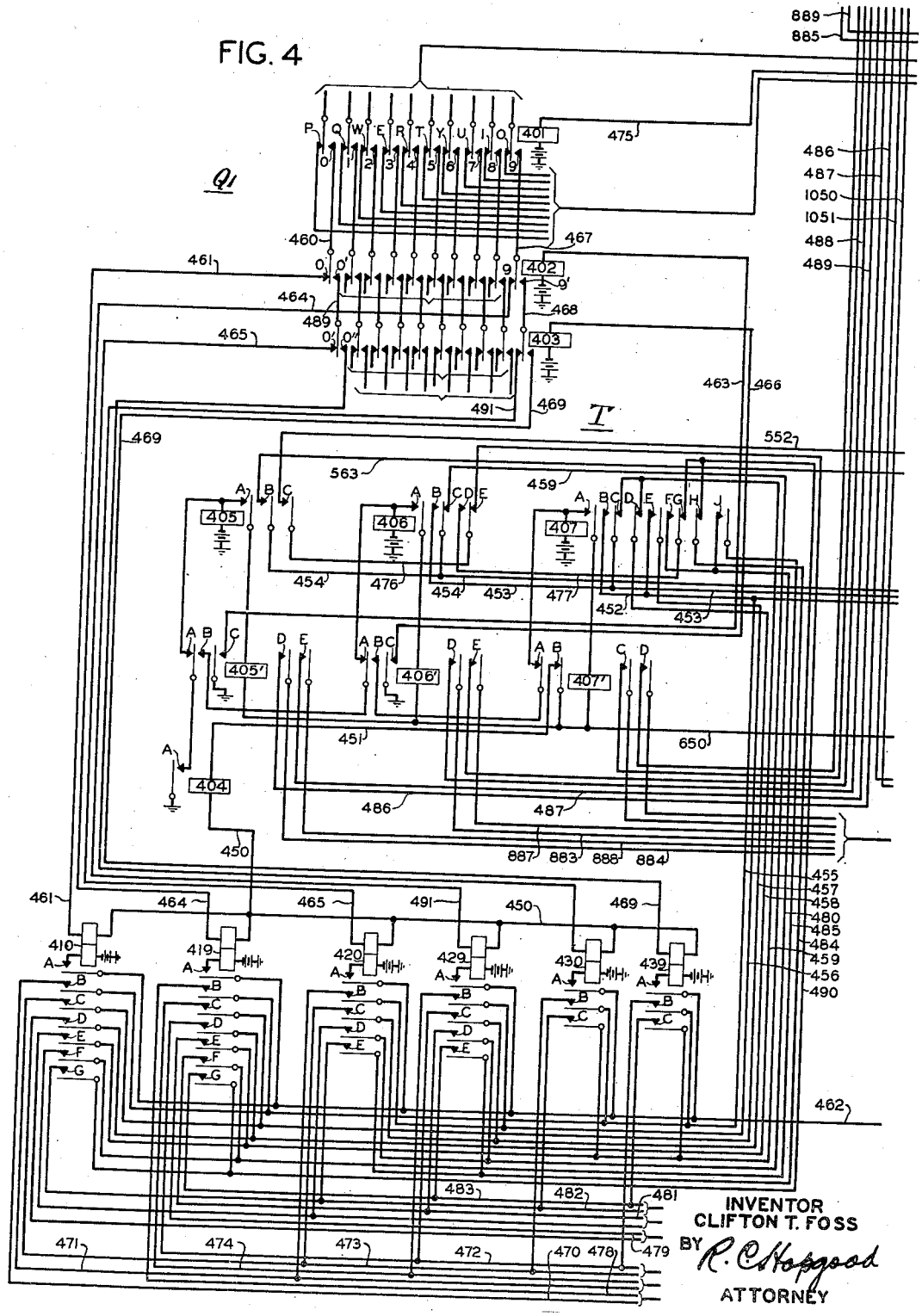
Figure 4 illustrates the price selection circuits of the master board used for integer selection.

The means for selecting predetermined indicators on the last shelf of the selected indicating mechanism and the means for predetermining the positions to which each of the selected indicators are to be set will now be explained. In Fig. 4 three groups of integer price selection relays and in Fig. 5 a group of fraction price selection relays are shown. The three groups of integer price selection relays comprise a group of hundreds relays, as 410 and 419, a group of tens relays, as 420 and 429, and a group of units relays 430 and 439. In the drawings only two relays are shown in each of these three groups, but in practice each group would be provided with eight additional relays, making ten in all, that is, one relay corresponding to each of the numerals on the peripheries of the hundreds, ten, and units indicators, to each of the contacts A—J on the rotary switches associated with the digit indicators on the high and low shelves of each indicating mechanism, and for each of the segments on commutators 710–712. In the fraction group eight relays 504–511 are shown, one corresponding to each of the quantities on the periphery of each of fraction indicator, to each of the contacts A—H on the rotary switches associated with the fractions indicators on the high and low shelves, and to each of the segments A—H on the commutator 713.

It was previously explained that the first two groups of conductors P—O and S—N, controlled by the permutation unit Q, are joint stock and price selecting circuits, and are normally connected to corresponding stock selection relays in the one letter group, and then are successively connected to corresponding stock selection relays in the two and three letter groups. The price selection relays, consequently, are not normally conditioned for selection, and means must be provided for associating them with the two groups of conductors mentioned. These means comprise two transfer relays, one 401 associated with the integer price selection relays, and the other 501 associated with the fractions price selection relays. The relays 401 and 501 are adapted to be simultaneously operated in a manner to be described later. Relay 401, when operated, serves to connect each of the first group of conductors P—O to a corresponding price selection relay in the hundreds group. Relay 501, when operated, serves to connect each of the second group of conductors S—N to a corresponding price selection relay in the fractions group.

Additional means are provided for successively connecting each of the conductors in the first group P—O to a corresponding price selection relay in the tens group and to a corresponding price selection relay in the units group. These means comprise three pairs of counting relays 405 and 405', 406 and 406', and 407 and 407', a pulsing relay 404 and two transfer relays 402 and 403. The pulsing relay 404 is operated whenever any one of the hundreds, tens or units price selection relays is energized. The counting relays serve to count the number of operations of the pulsing relay, which is in effect to count the number of digit price selection groups in which a relay is selected. When a hundreds price selection relay is operated, the first pair of counting relays 405 and 405' is energized, and they in turn cause transfer relay 402 to operate, thus connecting each of the first group of conductors P—O to a corresponding relay in the tens group. Similarly, the selection of a tens relay is followed by the operation of the second pair of counting relays 406 and 406' and the transfer relay 403, with the result that each of the first group of conductors is connected to a corresponding relay in the units group; while the selection of a units relay is followed by the operation of the third pair of counting relays 407 and 407', with the result, among other things to be described later, that the operating circuit of the pulsing relay 404 is opened. The opening of this circuit prevents any further operation of the counting relays by a false operation of the pulsing relay.

Upon the operation of the transfer relay 501 the fraction relays 504–511, as previously stated, are conditioned for selection by the permutation unit Q. Associated with the fractions relays are two pairs of counting relays 503 and 503' and 512 and 512' which are adapted to be successively operated under control of a pulsing relay 502. The pulsing relay is first operated when a fraction price selection relay is operated, and is next operated, as will be explained later, when a shelf selecting signal is received. The functions of the two pairs of counting relays will be explained later. It should be noted that in each pair of counting relays associated with the digits and with the fractions price selection relays, the first relay of the pair, as 405, is operated upon the operation of the associated pulsing relay, as 404, and at the same time the second relay of the pair, as 405', is prepared for operation but is not then operated since both terminals of its winding are grounded. However, upon the release of the pulsing relay the second relay, as 405', of the pair is operated.

It should be observed here that in the present system the price is transmitted in a straightforward manner, that is, the highest order of the price is transmitted first and then the lesser orders are transmitted consecutively. If, for example, the entire price 128⅛ is to be transmitted, the 1 is transmitted first, and then the 2, 8 and ⅛ are successively transmitted. Furthermore, in posting a new quotation the entire price need not be transmitted, but instead the highest order of the new price that differs from the previous price on the same stock is transmitted first, and then the lesser orders, if any, of the new price are transmitted consecutively. If, for example, a previous price is 128⅛ and the new price is 138⅛, the 3 is transmitted first since it is the highest order of the new price differing from the previous price, and then the 8 and ⅛ are successively transmitted. It may be remarked here that, for a reason that will be explained later, the fraction of a price is invariably transmitted.

Although as pointed out above abridged quotations may be transmitted, it must be borne in mind that price changes according to my invention operate comparison means to also set new "high" or "low" quotations. Accordingly, only those quotations in which the value of the highest changed digit is intermediate the value of the digits previously posted as high and low may be used in such abridged transmissions, unless these figures do in fact constitute a new high or new low quotation. However, since most of the changes in a stock quotation during the day are only fractional, the abridged signals may be largely used for most of the quotations. If the stock has varied more than a whole point it is desirable to transmit the complete quotation so as to avoid any confusion to those reading the tape.

It is evident, therefore, that when the hundreds digit is the highest order of the new price differing from the previous price on the same stock, four price selecting signals will be transmitted, one to effect the positioning of the hundreds indicator, one the tens indicator, one the units indicator, and the last the fractions indicator; when the tens digit is the highest order of the new price differing from the previous price on the same stock three price selecting signals will be transmitted, one to effect the positioning of the tens indicator, one the units indicator, and the last the fractions indicator; when the units digit is the highest order of the new price differing from the previous price on the same stock two price selecting signals will be transmitted, one for effecting the positioning of the units indicator, and the other the fractions indicator; and finally, when the fraction is the highest order of the new price differing from the previous price on the same stock a single price selecting signal will be transmitted to effect the positioning of the fractions indicator.

When it is remembered that the hundreds group of price selection relays is selected first, and then the tens and units groups successively thereafter, it is apparent that when the units digit is the highest order of the new price differing from the previous price, of the two price selecting signals transmitted, the first will select one of the hundreds group and the second will select one of the fractions group; when the tens digit is the highest order of the new price differing from the previous price, of the three price selecting signals transmitted, the first will select one of the hundreds group, the second will select one of the tens group, and the last will select one of the fractions group; and when the hundreds digit is the highest order of the price differing from the previous price, of the four price selecting signals transmitted, the first will select a relay in the hundreds group, the second will select a relay in the tens group, the third will select a relay in the units group, and the last will select a relay in the fractions group.

It is therefore necessary, when the units digit is the highest order of the new price differing from the previous price, that the hundreds price selection relays control the positioning of the units indicators; when the tens digit is the highest order of the new price differing from the previous price, that the hundreds price selection relays control the positioning of the tens indicators and that the tens price selection relays control the positioning of the units indicators; and finally, when the hundreds digit is the highest order of the new price differing from the previous price, that the hundreds, tens and units price selection relays control the positioning of the hundreds, tens and units indicators, respectively. The fractions relays have not been mentioned above as they invariably control the positioning of the fractions indicators.

From the foregoing explanation it is apparent that means must be provided for predetermining whether the hundreds price selection relays are to control the positioning of the hundreds, tens or units indicators, and whether the tens price selection relays are to control the tens or units indicators. These means comprise the three pairs of counting relays 405 and 405', 406 and 406', 407 and 407', and the pulsing relay 404, certain functions of which have been previously described.

When a hundreds price selection relay is alone operated, the first pair of counting relays, 405 and 405', is then operated by the pulsing relay with the result, as will be presently explained, that the operated hundreds relay is caused to control the positioning of the units indicators; when a hundreds and a tens relay are operated the first pair of counting relays, 405 and 405', and the second pair, 406 and 406', are successively operated with the result that the operated hundreds relay is caused to control the positioning of the tens indicators and the operated tens relay is caused to control the positioning of the units indicators; and when a hundreds, tens and units relay are operated, then the three pairs of counting relays are operated, causing the operated hundreds, tens and units relays to control the positioning of the hundreds, tens and units indicators, respectively.

The means by which the price selection relays are caused to control the positioning of the indicators will now be explained. When a stock relay and the first pair of counting relays, 405 and 405', are energized an operating circuit for the clutch magnet of the units indicator on the last shelf of the selected indicating mechanism is prepared; when a stock relay, the first and the second pair of counting relays, 406 and 406', are energized operating circuits for the clutch magnets of the tens and units indicators on the last shelf are prepared; when a stock relay and the three pairs of counting relays, 405–407', are energized operating circuits for the clutch magnets of the hundreds, tens and units indicators are prepared; and when a stock relay and the pair of counting relays, 512 and 512', are energized an operating circuit is prepared for the fractions indicator on the last shelf. The circuit for the clutch magnet of the hundreds indicator 827 on the last shelf of the indicating mechanism of Fig. 8 may be traced, for example, from battery, winding of the clutch magnet of indicator 827, conductor 850, contact E of relay 801, conductor 873, contact B of relay 714, conductor 452, contacts B of relay 407, contacts B of relay 406, contacts B of relay 405, conductor 563, to normally open contact B of relay 512'; the circuit for the clutch magnet of the tens indicator 828 on the last shelf may be traced from battery, winding of clutch magnet of tens indicator 828, conductor 851, contact F of stock relay 801, conductor 874, contacts B of relay 718, conductor 453, contacts B of relay 406, contacts B of relay 405, and over conductor 563 to normally open contact B of relay 512'; the circuit for the clutch magnet of the units indicator 829 on the last shelf may be traced from battery, clutch magnet of indicator 829, conductor 852, contact G of stock relay 801, conductor 875, contact B of relay 722, conductor 454, contact B of relay 405 to the point previously stated; and the circuit of the clutch magnet of the fractions indicator 830 may be traced from battery, clutch magnet of indicator 830, contact H of stock relay 801, conductor 876, contact B of relay 726, conductor 564, to normally open contact B of relay 512'. It is thus seen that the operating circuits for the clutch magnets extend through contacts B of counting relays 714–726 and that these circuits are all completed by the operation of relay 512'. As previously explained the operation of the clutch magnet of any indicator conditions the indicator to be driven by its driving shaft.

It will be remembered that in the hundreds group of price selection relays there are ten relays, of which only two, 410 and 419, are shown; similarly, in each of the tens and units groups there are ten relays, of which only 420 and 429 in the tens group and 430 and 439 in the units group are shown. When the three pairs of counting relays 405–407', are operated any one of the hundreds relays serves to prepare a circuit for grounding a corresponding segment in commutator 710, any one of the tens relays serves to prepare a circuit for grounding a corresponding segment in commutator 711, any one of the units relays serves to prepare a circuit for grounding a corresponding segment in commutator 712, and any one of the fractions relays serves to prepare a circuit for grounding a corresponding segment in commutator 713. When the first two pairs of counting relays 405–406' are operated any one of the hundreds relays serves to ground a corresponding segment of commutator 711, any one of the tens relays serves to prepare a circuit for grounding a segment of commutator 712, and any one of the fractions relays serves to prepare a circuit for grounding a segment of commutator 713. Also when the first pair of counting relays, 405–405', is operated any one of the hundreds relays serves to prepare a circuit for grounding a corresponding segment on commutator 712, and any one of the fractions relays serves to prepare a circuit for grounding a corresponding segment in the commutator 713. Each of the relays in the hundreds group serves, therefore, to ground corresponding segments on each of the commutators 710–712, each of the relays in the tens group serves to ground corresponding segments on each of the commutators 711–712, and each of the relays in the units and fractions groups serves to ground corresponding segments on the commutators 712 and 713, respectively. For example, hundreds relay 410 serves to ground segment A on commutators 710–712. The effect of grounding segments of commutators 710–713 will be described later.

Figure 5:
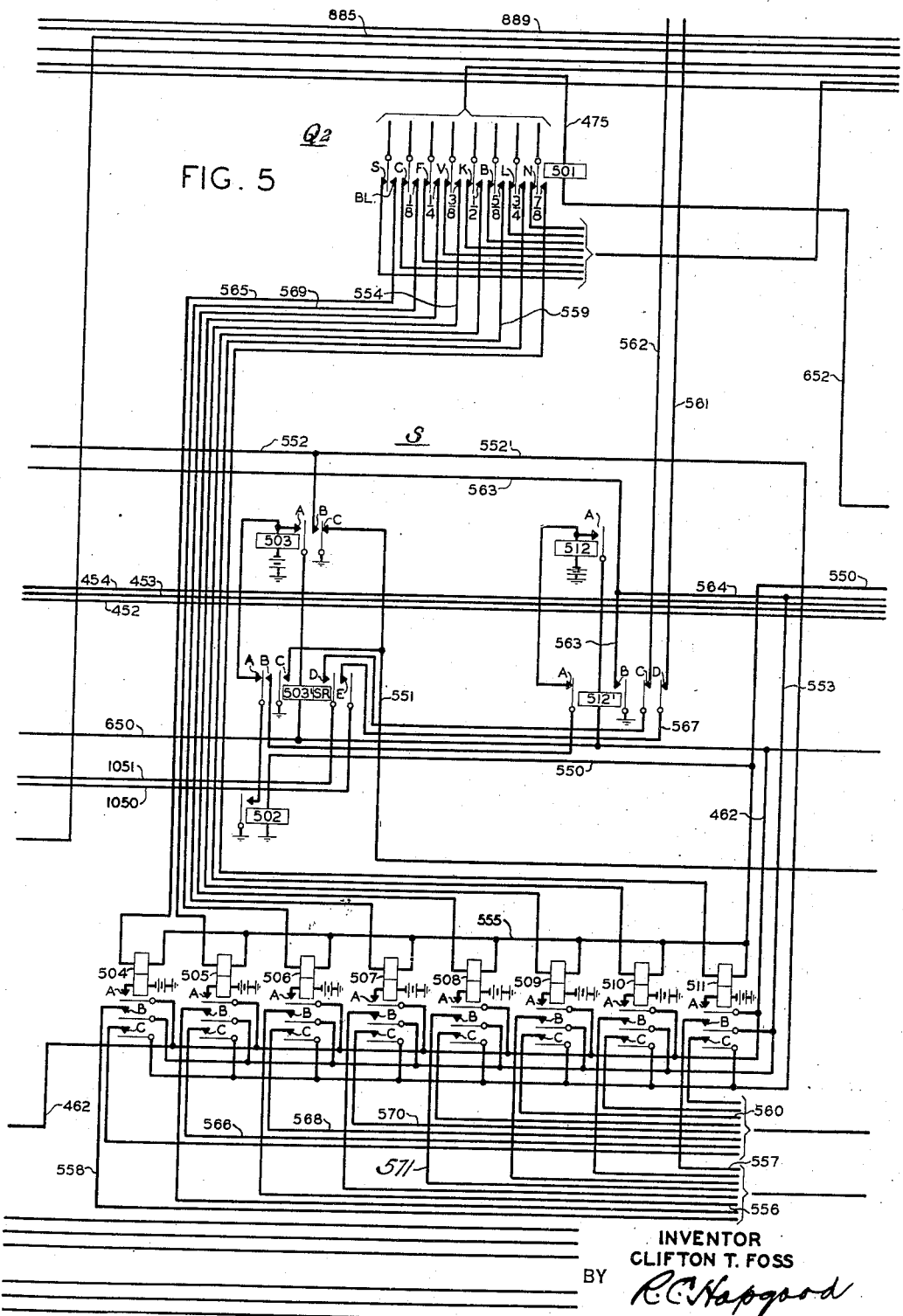
Figure 5 illustrates the fraction price selection circuits of the master board.

It was explained above that the present system is arranged so that the same selecting means, namely, the permutation unit Q, is effective to select both the stock selection relays of Fig. 3 and the price selection relays of Figs. 4 and 5, and that the transfer relays 401 and 501 serve to transfer the first two groups of conductors P—O and S—N, which are controlled by the permutation unit Q, into association with the digits and fractins price selecting relays. These relays are controlled by a pulsing relay 606, operable over several of the group of "stunt" circuits 1–6, and a pair of counting relays 604 and 605. These counting relays also perform other functions that will now be briefly mentioned. Relay 604, when operated, serves to release the stock relay last selected if it should be operated, thus insuring that the proper indicating mechanism will be selected when the stock relay, last selected, is operated. The present system is also arranged so that overlap is provided, that is, the system is arranged so that the stock selection relays can be selected for another stock selection while the indicators of the stock previously selected are being positioned. To accomplish this it is necessary that the operated stock selection relays be released after the price selection relays have been selected but before the indicators selected by these relays have been positioned. This is effected by relay 605 which, upon its operation, releases the operated stock selection relays, and upon its release reconditions these relays for a further selection.

Figure 6:
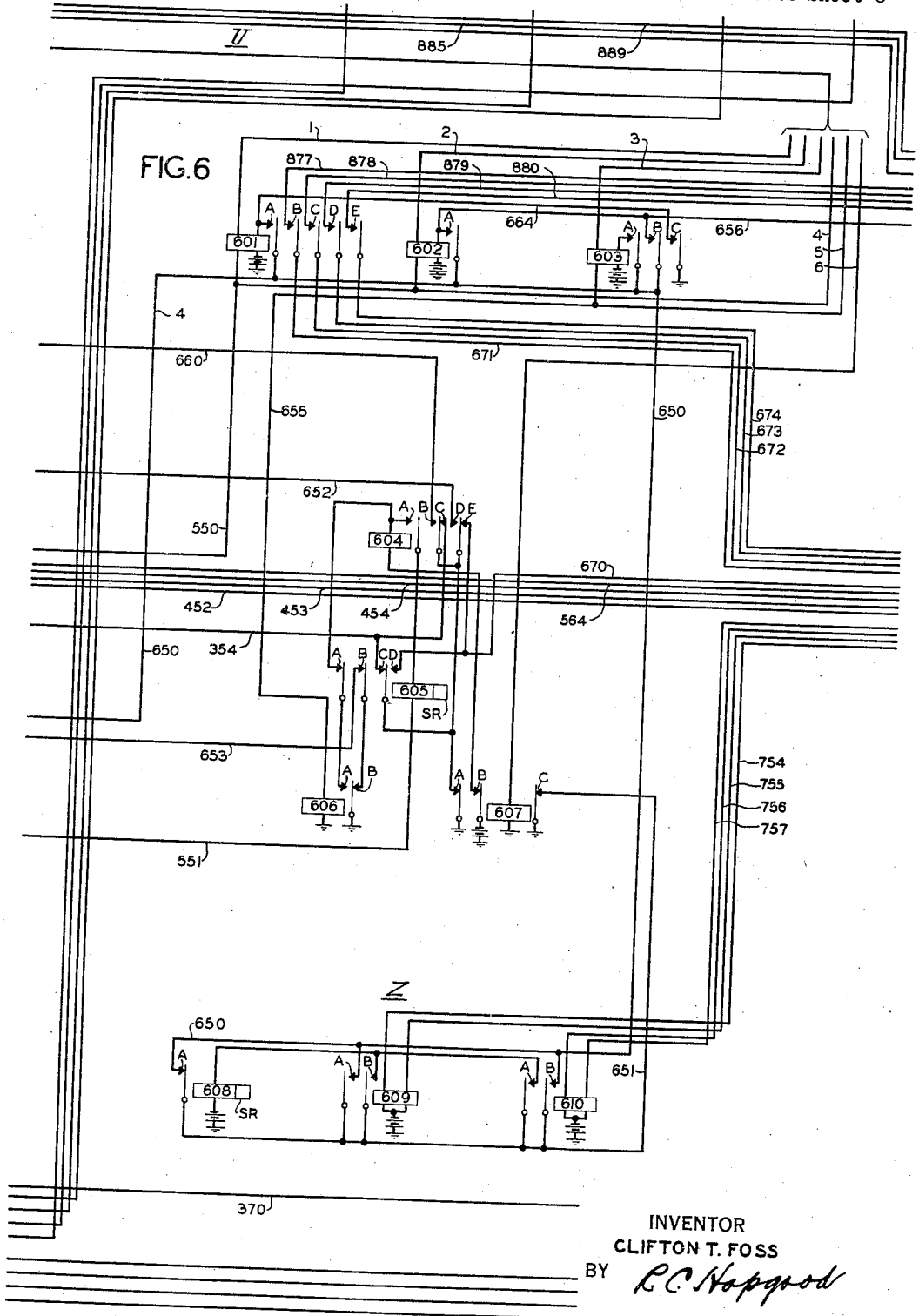
Figure 6 illustrates the shelf selecting circuits of the master board together with certain control and auxiliary circuits.

The means for selecting the indicators on the various shelves, other than the last shelf, of the selected indicating mechanism will now be described. The means to be described do not relate to the automatic shelf selecting means which have previously been mentioned. It will be remembered that the automatic shelf selecting means, when operated, are effective to alter a prepared signal so that either a high or a low shelf selecting signal is transmitted instead of the prepared start signal. The shelf selecting means now to be described are the means operated by the shelf selecting signals transmitted. Referring to Fig. 6, relay 601 is a low shelf selecting relay, relay 602 is a high shelf selecting relay, and relay 603 is an open shelf selecting relay. These relays are adapted to be selectively operated over the group of "shunt" conductors 1–6. If it be assumed that stock relay 801 is first selected, relay 601, when operated, serves to connect the operating circuits for the clutch magnets of the indicators 831–834 on the low shelf in multiple with the clutch magnet circuits for the indicators 827–830 on the last shelf; relay 602, when operated, causes the operation of auxiliary relay 802 which, as previously explained, serves to connect the operating circuits of the clutch magnets for the indicators 835–839 on the high shelf in multiple with the clutch magnet circuits for the corresponding indicators on the last shelf; and relay 603, when operated, causes both relays 601 and 602 to be operated, with the result that the clutch magnets of the indicators on the open, high and low shelves are multipled to the circuits of the clutch magnets for the indicators on the last shelf. It is, therefore, evident that by selectively operating any one of the relays 601–603 the operating circuits of clutch magnets for any of the indicators on the open, high or low shelves can be multipled with the clutch magnet circuits of corresponding indicators on the last shelf.

The means for automatic shelf selection will now be described. These means comprise in addition to the digits price selection relays and their associated counting relays, previously described, the four potentiometers 901–904 of Fig. 9, the rotary switches 803–810 of Fig. 8, associated with the indicators on the high and low shelves of the indicating mechanism, and two groups of shelf selecting relays 1001–1004 and 1005–1008 of Fig. 10. The rotary switches and their associated indicators have been described above. Of the four potentiometers 901 is a hundreds potentiometer, 902 is a tens potentiometer, 903 a units potentiometer and 904 a fractions potentiometer. Each of the potentiometers 901–903 is provided with ten taps A—J, and the potentiometer 904 is provided with eight taps A—H. Each of the taps A—J of potentiometers 901–903 is multipled to a corresponding one of the contacts A—J in switches 807 and 803, 808 and 804 and 809 and 805, respectively; while each of the taps A—H of potentiometer 904 is multipled to a corresponding one of the contacts A—H in switches 806 and 810. Positive battery is connected to the first tap A in each of the potentiometers 901–4 and negative battery is connected to the last tap J in each of the potentiometers 901–03 and the last tap H of potentiometer 904.

It has previously been explained that the hundreds price selection relays are adapted to select either the hundreds, tens or units indicators on the last shelf of the selected indicating mechanism, that the tens price selection relays are adapted to select either the tens or units indicators, and that the units and fractions price selection relays are adapted to invariably select the units and the fractions indicators, respectively. Similarly the hundreds price selection relays are adapted to ground a corresponding tap in either the hundreds potentiometers 901, the tens potentiometer 902 or the units potentiometer 903, the tens price selection relays are adapted to ground a corresponding tap in either the tens potentiometer 902 or the units potentiometer 903, and the units and fractions price selection relays are adapted to ground a corresponding tap in the units potentiometer 903 and the fractions potentiometer 904. For example, the hundreds price selection relay 410 is adapted when only the first pair of counting relays 405 and 405' are operated to ground tap A in units potentiometers 903, when the first pair of counting relays and the second pair 406 and 406' are operated to ground tap A in tens potentiometer 902, and when the first two pairs of counting relays and also the third pair 407 and 407' are operated to ground tap A in hundreds potentiometer 901.

The first or high shelf group of selection relays 1001–1004 comprises a hundreds relay 1001, a tens relay 1002, a units relay 1003 and a fractions relay 1004 and the second or low shelf group of selection relays 1005–1008 likewise comprises a hundreds relay 1005, a tens relay 1006, a units relay 1007 and a fractions relay 1008. These relays are of the polar differential type and are adjusted to permit their armatures to center between the relay contacts when no current is flowing through either of the windings. Each relay except the hundreds relays, is provided with a right hand or operating winding, and a left hand or biasing winding. The hundreds relays are provided only with operating windings. In the high shelf group the biasing windings of relays 1002–1004 are connected in series over a circuit controlled by contact M of the hundreds relay 1001. This circuit is tapped between relays 1002 and 1003 by a lead extending to contact M of relay 1001, and between relays 1003 and 1004 by a lead extending to contact M of relay 1003 so that when relay 1001 closes its contact M the biasing windings of 1002–1004 are energized in series, when relay 1002 closes its M contact the biasing windings of 1003 and 1004 are energized and when relay 1003 closes its M contact, the biasing winding of relay 1004 is energized. In the low shelf group, the biasing windings of relays 1005–1008 are connected in series over a circuit controlled by contact S of the hundreds relay 1005. This circuit is likewise tapped at a point intermediate relays 1005 and 1006, and another point between 1006 and 1007, so that when relay 1005 closes its contact S the biasing windings of relays 1006 to 1008 are energized, when relay 1006 closes its S contact, the biasing windings of relays 1007 to 1008 are energized, and when relay 1007 closes its S contact, the biasing winding of relay 1008 is energized. When positive battery is connected to the operating winding of any of the relays the armature of that relay will be moved to the S contact, while if positive battery is connected to the biasing winding of any of the relays in the high shelf group the armature of that relay will move to contact M and if positive battery is connected to the biasing winding of any of relays in the low shelf group the armature of that relay will move to contact S. It is evident that the connection of negative battery to either the biasing or operating winding of any of these relays will cause the opposite effect to that described above. It should be noted that the current flowing through the biasing winding of any of the relays is greater than the current flowing through its operating winding.

Any of the relays in the high shelf group when operated to close its S contact serves to connect ground to conductor 1050 and any of the relays in the low shelf group when operated to close its M contact serves to connect ground to conductor 1051 for a purpose to be explained presently. From the foregoing description it is evident that when any of the hundreds, tens or units relays in the high shelf group is operated in one direction to close its M contact, any relay of a lower order, which has previously been operated in the opposite direction, to close its S contact, is therefore energized in a direction to close its M contact, and that when any one of the hundreds, tens or units relays in the low shelf is operated in one direction to close its S contact, any relay of a lower order, which has previously been operated in the opposite direction to close its M contact, is therefore energized in a direction to close its S contacts. Consequently the relay of the highest order operated in the high shelf group determines whether or not conductor 1050 is to be grounded, and the relay of the high order operated in the low shelf group determines whether or not conductor 1051 is to be grounded. The means for connecting positive or negative battery to the operating windings of any of the relays will be described later.

When a stock relay, as 801 has been operated, the fractions relay 1004 in the high shelf group and fractions relay 1008 in the low shelf group have their operating windings connected to the common ring M of rotary switches 810 and 806, respectively. When a stock relay, as 801, and the first pair of counting relays 405 and 405' is operated, the units relay 1003 in the high shelf group and the units relay 1007 in the low shelf group have their operating windings connected to the common ring M of rotary switches 809 and 805, respectively; when a stock relay, as 801, and the second pair of counting relays 406 and 406' is operated, the tens relay 1002 in the high shelf group and the tens relay 1006 in the low shelf group have their operating windings connected to the common ring M of rotary switches 808 and 804, respectively; and also when a stock relay, as 801, and the third pair of counting relays 407 and 407' is operated, the hundreds relay 1001 in the high shelf group and the hundreds relay 1005 in the low shelf group have their operating windings connected to the common ring M of rotary switches 807 and 803, respectively.

It will be remembered that wipers N in each of the rotary switches rest on a contact corresponding to the numeral displayed by the associated indicator, and that each of the contacts A—J in rotary switches 807 and 803 is connected to a corresponding tap in the hundreds potentiometer 901, that each of the contacts A—J in rotary switches 808 and 804 is connected to a corresponding tap in the tens potentiometer 902, that each of the contacts A—J in rotary switches 809 and 805 is connected to a corresponding tap in units potentiometer 903, and that each of the contacts A—H in rotary switches 810 and 806 is connected to a corresponding tap in fractions potentiometer 904. Consequently, the operating winding of the hundreds relay 1001 in the high shelf group is connected through the rotary switch 807 to a tap of the hundreds potentiometer 901 corresponding to the hundreds digit of the previous high price; the operating winding of the hundreds relay 1005 in the low shelf group is connected through the rotary switch 803 to a tap of the same potentiometer corresponding to the hundreds digit of the previous low price, the operating winding of the tens relay 1002 in the high shelf group is connected through the rotary switch 808 to a tap of tens potentiometer 902 corresponding to the tens digit of the previous high price; the operating winding of the tens relay 1006 in the low shelf group is connected through rotary switch 804 to a tap in the same potentiometer corresponding to the tens digit of the previous low price, the operating winding of the units relay 1003 in the high shelf group is connected through the rotary switch 809 to a tap of units potentiometer 903 corresponding to the units digit of the previous high price, the operating winding of the units relay 1007 in the low shelf group is connected through the rotary switch 806 to a tap of the same potentiometer corresponding to the units digit of the previous low price; the operating winding of the fraction relay 1004 in the high shelf is connected through rotary switch 810 to a tap of fractions potentiometer 904 corresponding to the fraction of the previous high price and the operating winding of fraction relay 1008 in the low shelf group is connected through rotary switch 806 to a tap of the same potentiometer corresponding to the fraction of the previous low price.

It is evident that when the circuits completed through the rotary switches 807 and 803 terminate in taps of the hundreds potentiometer 901 intermediate the grounded tap, which is grounded by an operated hundreds price selection relay, and the positive battery connected to tap A, positive potential is connected to the operating windings of the relay 1001 in the high shelf group and the relay 1005 in the low shelf group with the result that conductor 1050 is grounded, while relay 1051 is not grounded; when the circuits, completed through the rotary switches 807 and 803 terminate in taps of the potentiometer 901 intermediate the grounded tap and the negative battery connected to tap J, negative potential is connected to the operating windings of the relays 1001 and 1005 with the result that conductor 1050 is ungrounded, while conductor 1051 is grounded. It is also evident that when the circuits completed through rotary switches 807 and 803 terminate in the same tap of potentiometer 901, and that tap is then grounded, no current will flow through the operating windings of either relay 1001 or 1005, with the result that neither conductor 1050 or 1051 will be grounded.

As the co-operation of the other potentiometers 902-4 in cooperation with their associated pair of rotary switches and their shelf selecting relays will be understood from the description above, a description of them will be omitted here.

It should be observed here that in transmitting a quotation under the present system signals are prepared for transmission as follows: first from one to three signals corresponding to the letters of a stock abbreviation, next a "stunt" signal which may be either a figure shift signal or a figure shift in combination with an open shelf selecting signal, then from one to four signals corresponding to the price of the quotation, and finally a signal designated as a start signal. These signals may be prepared on a tape by perforation, as is common in multiplex telegraphy, or may be set up on a transmitter of the direct key board type.

Conductor 1050 is connected to the contact 139 of the transmitter when relay 503' is operated, and conductor 1051 is connected to the contact 140 of the transmitter when relay 503' is operated. As counting relay 503' is not operated until the fraction signal has been transmitted, it is evident that the grounding of either or both of conductors 1050 and 1051 alters the connection to the transmitter after the transmission of the last price selecting signal and prior to the transmission of the start signal. If the conductor 1050 is alone grounded, and hence contact 139 of the transmitter is grounded, the start signal is modified so that a high shelf selecting signal is transmitted. If the conductor 1051 and lead contact 140 of the transmitter are alone grounded, the start signal is modified so that a low shelf selecting signal is transmitted. If neither conductor 1050 or 1051 is grounded, the start signal will be transmitted unmodified.

When either a low, high, or open shelf selecting signal or a start signal is transmitted, the pulsing relay 502 is operated, causing the operation of the pair of counting relays 512 and 512'. Relay 512' upon operating, opens the connection between the conductors 1050 and 1051 and the transmitting contacts 139 and 140, and completes the operating circuits for the clutch magnets of the selected indicators and completes the circuits selectively prepared by the price selecting relays for grounding a segment in selected commutators 710-13. As previously explained, the energization of the clutch magnet, in any indicator, as 827, brings the driven tooth, as 1128, into alignment with the driving tooth, as 1127, rigidly attached to the driving shaft, as 732.

The means for releasing the selected indicators from their driving shafts at a particular time so that the desired digit or fraction on their periphery will be displayed will now be described. It is evident that when counting relay 512' is energized, the brushes N of commutators 710-12 may be resting on any contact. Consequently, to insure that the selected indicators will be positioned to display the desired rigit or fraction, it is necessary that the driving shafts 732-35 make at least one revolution before the selected indicators are unlocked therefrom. If the shafts did not make one complete revolution the driving tooth 1127 might never engage the driven tooth 1128 associated with the drum 1101, and the proper digit or fraction could not be displayed.

This will be evident from a description of commutator 710. Assume that the indicator 827 was last set to display 1 which corresponds to segment B of commutator 710. From the explanation previously given it will be understood that the driven tooth 1128 is in a position corresponding to segment B of commutator 710. Now if the brush N of commutator 710 is beyond segment B when counting relay 512′ is energized, it is evident that driving tooth 1127 will be beyond driven tooth 1128. Assume that brush N is on segment C, then driving tooth 1127 will not engage driven tooth 1128 until brush N has again reached segment B. From this it will be apparent that to insure the positive engagement of driving tooth 1127 and driven tooth 1128 on the indicator 827, it is necessary that brush N, or what is the same thing, shaft 732 makes at least one complete revolution. From this explanation, it is evident that the shafts 733–735 must likewise be driven through a complete revolution before the clutch magnets of the indicators adapted to be driven thereby are released.

The means for insuring that the shafts 732–35 make at least one complete revolution before the clutch magnets of the selected indicators are released comprise the commutators 710–713 and the counting relays 714–729. The construction of the commutators has been previously described. Associated with commutator 710 are the counting relays 714–717, with the commutator 711 the counting relays 718–721, with the commutator 712 the counting relays 722–25 and with the commutator 713 the counting relays 726–729.

As was previously explained, when the hundreds indicators are to be selected conductor 452 is grounded, as is also one of the ten segments A–J of commutator 710, depending upon the position to which the selected hundreds indicators are to be set. When the tens indicators are to be selected, conductor 453 and one of the segments A–J of commutator 711 are grounded; when the units indicators are to be selected conductor 454 and one of the segments A–J of commutator 712 are grounded, and when the fractions indicators are to be selected conductor 564 and one of the segments A–H of commutator 713 are grounded. At the same time that ground is applied as explained above, that is when counting relay 512′ operates, the clutch magnets of the selected indicators are energized. As the method of releasing the selected hundreds indicators from shaft 732 is typical of the release of the other indicators, a description of their release will serve for all. Let us assume that the clutch magnets of the selected hundreds indicators are energized at the time that brush N of commutator 710 is on segment C, and that indicator 827 displaying the numeral 1 which means that the driven tooth 1128 is in a position corresponding to segment B of commutator 710. It is evident in this case that unless the clutch magnet indicator 827 remains energized until the shaft 732 has made at least one complete revolution the driving tooth 1127 will not engage the driven tooth 1128 for indicator 827, and the indicator will display some other numeral than the desired 2. To obviate this difficulty the circuit for energizing the clutch magnet of the hundreds indicators extends through a contact of relay 714. When the clutch magnets of the selected hundreds indicators are energized, and conductor 452 as well as a segment of commutator 710 is grounded, the relay 717 will not operate if the brush N of the commutator 710 rests on a grounded segment, as both terminals of its winding are then grounded, one at conductor 452 and the other at the grounded segment of commutator 710. However, when brush U leaves the grounded segment, relay 717 operates. Relay 715 operates when brush N again reaches the grounded segment, but relay 716 cannot operate until the brush N leaves the grounded segment, as one terminal of the winding of this relay is grounded at conductor 452 and the other at the commutator 710. However, as soon as the brush N leaves the grounded segment, relay 716 operates, and when the brush again reaches the grounded segment, relay 714 operates. The operation of relay 714 releases the clutch magnets of all the selected hundreds indicators, and since the grounded commutator segment corresponds to the position of the driving tooth 1127 at the time of release, the hundreds indicators are released and locked, as previously described, so that they display the desired numeral. The tens, units or fractions indicators are similarly set to predetermined positions. It is evident from the foregoing description that if the selected hundreds indicators are clutched to shaft 732, the wiper N of commutator 710, or what is the same thing, the shaft 732, must make at least one complete revolution determined by the number of times the wiper N closes the grounded commutator signals before relay 17 is operated to open the clutch magnet circuit 452. The selected hundreds indicators are, therefore, operatively driven through at least one revolution before being released from shaft 732 and locked in the position of release. The selected tens units and fractions indicators are similarly driven through at least one revolution by their associated shafts before they are released from these shafts and locked in the position of release.

As the price selection relays and their associated counting relays as well as the shelf selecting relays have remained operated up to this time, means must be provided for releasing them. These means comprise relays 608–10, inclusive. The price selection relays 410—439, and 504—511; the counting relays 405—407′, and 503—503′ and 512—512′ and the shelf selecting relays 601—603 are locked to conductor 650 which is grounded at contacts of relay 607. Relay 609 is provided with a double winding, one of which is included in a circuit controlled by relay 714 and the other of which is included in a circuit controlled by relay 718. Relay 610 is provided with a double winding one of which is included in a circuit controlled by relay 722 and the other of which is in a circuit controlled by relay 725. These circuits are normally opened, so that relays 609—610 are normally deenergized. Hence relay 608, which is controlled by these relays is also de-energized thus connecting conductor 650 to grounded conductor 651. When either conductor 452 or 453 is grounded, relay 609 is energized, and when either conductor 454 or 564 is grounded, relay 610 is energized. The operation of either of these relays causes slow release relay 608 to pull up, but previously the conductor 650 is connected to grounded conductor 651 through contacts of any one or both of relays 609 and 610. Consequently the operation of relay 608 does not release the price selecting relays, etc. However, when the relays 714, 718, 722 and 726 are operated, the operating windings of relays 609–10 are opened and these relays release, disconnecting conductor 650 from grounded conductor 651. As relay 608 is slow releasing, it does not reconnect conductor 650 to grounded conductor 651 until all of the five selecting relays, etc. have been released. When relay 698 releases, the price selecting relays are again ready for selection.

As in many cases the sending operator may discover he has sent an incorrect indicating signal, it seems desirable to provide means for releasing any portion of the apparatus selected incorrectly. This means comprises a relay 607 which is adapted to be operated over a release circuit 6 which is one of the stunt circuits. This relay removes ground from conductor 650 restoring the price selecting relays, counting relays and shelf selector relays to normal. At its A and B contacts it also causes the release of the stock relay, the stock selection relays and associated counting relays.

The operation of the transmitting means O, the permutation unit Q and the master board controlled thereby in posting an open, a new high and a new low quotation will now be described.

Let it be assumed that a tape has been prepared for transmitting the letter M and that this tape is inserted in the transmitter so that the perforations corresponding to the letter M will be above the pins (previously mentioned but not shown on the drawings) after the next stopping action. Then when the tape stop lever 126 is closed brush arm 110 is released and begins rotation. While the brush arm passes over segment 112 a circuit is completed from battery, operating winding of relay 104, common ring 111, brush arm 110, and segment 112 to ground. Relay 104 moves its armature to its M contact, thus causing relays 105–108 to move their armatures to their M contact. When the brush arm 110 reaches segment 113 ground is removed from common ring 111 and consequently master relay 104 and sending relays 105–108 move their armatures to their S contacts. Also at this time the stepping mechanism operates and the tape assumes a position such that the perforated code for "M" is directly above the transmitter pins. This allows transmitter contacts 119 and 120 to lie against ungrounded contacts 136 and 137 respectively, and armatures 121, 122 and 123 to lie against grounded contacts 133, 134 and 135 respectively.

The brush arm 110 reaches segment 114 at which time no ground is connected to the common ring 111 and the master relay 104 and the sending relays 105–108 retain their armatures on their S contacts. Likewise when brush arm 110 reaches segment 115, the common ring 111 is ungrounded and the armatures of the master and sending relays are retained on the S contacts. When the brush arm 110 reaches segment 116 a circuit is established from battery, operating winding of relay 104, common ring 111, brush arm 110, segment 116, transmitter contact 121 and contact 133 to ground. The armatures of the master and sending relays are then moved to their M contacts. Likewise when the brush arm 110 passes over segments 117 and 118 the circuit through the operating winding of the master relay 104 is completed, and the armature of this relay as well as the armatures of the sending relays 105–108 are retained on their M contacts. Finally the brush arm 110 again returns to segment 112 and regardless of the position of the transmitter armatures 119–123 the armature of the master relay and the contacts of the sending relays are either returned to or retained on their M contacts.

As the M contacts of the sending relays 105–108 are connected to negative battery and their S contacts are connected to positive battery, it is evident that during the transmission of the letter M the same signal has been transmitted over conductor 150 to receiving relay 203, over conductor 152 to operate the printer magnets 130 of a local printer and over lines L1 and L2. This signal comprises one interval of positive battery (the start signal), two intervals of positive battery (1st and 2nd pulses); three intervals of negative battery (3rd, 4th and 5th pulses) and a final longer interval of negative battery (the stop pulse).

By operating the release arm 126, the clutch magnet 128 can be released, thereby causing its retracted armature 129 to engage and stop the brush arm 110.

It is evident from the foregoing that any desired signal or series of signals can be sent simultaneously over conductors 150, 151 and lines L1 and L2 by operating the transmitting means O in a suitable manner and that when transmission has ended the transmitting distributor brush 110 can be brought to rest.

It should again be observed here that a receiving board of the type disclosed in the above mentioned co-pending application is associated with each of the lines L1 and L2. As the operation of these boards by signals transmitted over lines L1 and L2 will be obvious from that application, no description of their operation will be given here. The operation of the local printer by the signals transmitted over conductor 151 is well known in the art, so that no description of it is given here.

The operation of the permutation unit Q in accordance with signals transmitted over conductor 150 will now be described. Let it be assumed that signals corresponding to the letter M are being transmitted by sending relay 105 over conductor 150. Receiving relay 203 is adapted to move its armature to its S contact when a positive pulse is received and to move its armature to its M contact when a negative pulse is received. Accordingly, the first impulse which is of positive polarity causes relay 203 to close its S contact. A circuit is thereby established from battery, through contact S of relay 203, conductor 224, contacts 222 associated with cam 223 and start magnet 219 to ground. Start magnet 219 is energized pulling up its armature 220 and freeing cam 221. The release of cam 221 allows brush 210 to be driven through the previously mentioned friction clutch. Cam 223, which is driven by the same shaft as cam 221, causes contact 222 to open, thus preventing further energization of start magnet 219 until the brush arm 210 has completed one revolution.

The next impulse received, which is also of positive polarity, causes the armature of relay 203 to be retained on its contact S. At the same time brush arm 210 is bridging the common ring 211 and segment 213, but as the armature of relay 203 is now on its S contact, the circuit of relay 250 is open.

The next impulse is received while the brush arm 210 is traversing segment 214, but since this signal is also positive no operation occurs.

The next or third impulse is received while the brush arm 210 is passing over segment 215. This impulse is of negative polarity and consequently the armature of relay 203 moves to contact M. A circuit is then completed from battery, through contact M of relay 203, conductor 225, common ring 211, brush arm 210, segment 215, conductor 228, and winding of relay 252 to ground. Relay 252 is therefore energized, and locks over a circuit comprising battery, contacts A of relay 255, conductor 252, conductor 235, contacts A of relay 252 and winding of relay 252 to ground.

The fourth impulse, which is received as the brush 210 is traversing segment 216, and is of negative polarity, causes the armature of relay 203 to remain on its contact M. A circuit is then established from battery through contact M of relay 203, conductor 225, common ring 211, brush arm 210, segment 216, conductor 229 and winding of relay 253 to ground. Relay 253 operates and locks over an obvious circuit extending through contact A of relay 255.

The fifth impulse which is also of negative polarity and is received as brush 210 is traversing segment 217, a circuit is completed from battery, through contact M of relay 203, conductor 225, common ring 211, brush arm 210, segment 217, conductor 230 and winding of relay 254 to ground. Relay 254 then operates and locks over an obvious circuit extending through contacts A of relay 255.

Brush arm 210 now passes to segment 218. At this time an impulse of negative polarity is received. This is a stop pulse and, as previously stated, is always negative regardless of the signal combination transmitted. Upon receipt of this impulse relay 203 operates to move its armature to contact M, which is without effect at this time since the circuit from contact M of relay 203 is open at the common ring 211. However, a circuit is established from battery through segment 209, brush arm 210, segment 218, conductor 231 and start magnet 247 to ground. Upon energizing, start magnet 247 attracts its armature 248, allowing cam 249 and, consequently, brush arm 260 to be rotated through a friction clutch (not shown).

Brush arm 260 first passes over segment 262, upon which a circuit is completed from battery through common ring 261, brush arm 260, segment 262, conductor 239, to contacts B of relays 252-254 and thence through certain parallel circuits from the armatures of the operated relays in this group. The parallel circuits established from conductor 239 under the conditions assumed are: contacts B of relay 252, conductor 244, left-hand or operating winding of relay 272 to ground; contacts B of relay 253, conductor 245, left-hand or operating winding of relay 273 to ground; and contacts B of relay 254, conductor 246, left-hand or operating winding of relay 274 to ground.

Relays 272-274 operate over the circuits just traced and lock over obvious circuits to ground on the armature of locking relay 276.

During this interval brush 210 in the receiving distributor has traversed segment 218 and cam 221 has returned to the normal position, as shown. Since, at this time, the circuit to start magnet 219 is open at contact S of receiving relay 203, the brush arm 210 is retained in its normal position by means of retracted stop arm 220 which engages the projection in the cam 221.

Likewise, brush arm 260 of the auxiliary distributor has reached segment 263, upon which a circuit is completed from battery through common ring 261, brush arm 260, segment 263, conductor 240 and winding of relay 255 to ground. Relay 255 thereupon operates, opening the locking circuits of the operated relays in group 250-254. These relays consequently release and the receiving distributor is restored to normal in readiness for the transmission of the next signal.

When brush arm 260 reaches segment 264, a circuit is completed from battery through the common ring 261, segment 264, conductor 241, and thence over two parallel circuits. The parallel circuits are: from conductor 241 to contacts B of operated relay 270, contact D of operated relay 271, contact G of operated relay 272, contact N of operated relay 273 and contact M of operated relay 274; and from conductor 241 through conductor 277.

Brush arm 260, upon reaching segment 265 which is multipled to segment 264, serves merely to prolong the impulse over the parallel circuits mentioned above. The brush arm now reaches segment 266 which is connected in common with segment 267, so that while brush arm 260 brushes the segments 266 and 267, a circuit is closed from battery through common ring 261, brush arm 260, segment 266 or 267, conductor 269 and winding of relay 276 to ground. Relay 276 operates, thereby opening the locking circuit of the operated relays in group 270-274. The operated relays in this group thereupon release, disconnecting the conductor M from conductor 241 controlled by the auxiliary distributor P2. When the brush arm 260 leaves segment 267, it is brought to rest before it reaches the first segment 262 by means of the retracted stop arm 248 which engages a projection on cam 249, since start relay 247 is then de-energized.

Thus, upon the transmission of the signal M from sending relay 105, the following operations occur: the receiving relay 203 co-operates with the receiving distributor P1 and the auxiliary distributor P2, to selectively operate the permutation unit Q in accordance with the received impulses thereby connecting the conductor M to conductor 241; after this, the auxiliary distributor P2 applies battery to conductor M and also to conductor 277; also both the receiving distributor P1 and the auxiliary distributor P2, as well as the permutation unit Q, are restored to normal awaiting the next selecting signal.

It is, therefore, obvious that the permutation unit Q can be selectively operated in accordance with signals received by relay 203 to connect any one of the four groups of conductors P—O, S—N, A—M and 1-6, with conductor 241, after which battery is applied to the selected conductor and conductor 277 by the auxiliary distributor P2.

It should be noted that, except for certain "stunt" contacts 1-6 which are numerically designated, the contacts of relay 274 are designated so as to correspond to the letter which must be transmitted to connect the conductor 241 thereto. For example, it has just been shown that the letter M must be transmitted to connect the conductor M to conductor 241 and conductor M is connected to conductor 241 to contacts M of relay 274.

It is to be understood that the transmitting means O and the permutation unit Q are merely a preferred embodiment of the means for controlling the selecting circuits whose operation is presently to be described, and that my invention is not to be limited by the transmitting means and the permutation unit particularly described, as it is apparent that the operation of the selecting circuits might be accomplished by other means.

Now that the operation of the transmitting means O and the permutation unit Q has been described, the operation of the master board in posting an opening quotation will now be described. Let it be assumed that the opening quotation for stock MMM is to be posted and the opening price is 90⅝. It has been previously mentioned that in transmitting quotations under the present system the signals corresponding to the letters of a stock abbreviation are transmitted first, a stunt signal which may be either a figure shift or a figure shift in combination with an open selection signal is transmitted next, then from one to four signals corresponding to the price of the quotation are transmitted, and finally, a signal designated as the start signal is transmitted.

Consequently, the first three code signals prepared for transmission by the sending operator will be those for the letters MMM. It is clear from the description just given of the transmitting means O and the permutation unit Q that the transmission of the signals corresponding to these letters will cause the auxiliary distributor P2 to apply battery to both conductors M and 277 three successive times.

When battery is first applied to conductor M, a circuit is completed for operating relay 310 which is the M relay in the one-letter group. The operating circuit for this relay may be traced from battery, common ring 261, auxiliary distributor P2, brush arm 260, segments 265 or 266, conductor 241, contact B of relay 270, contact D of relay 271, contact G of relay 272, contact M of relay 273, contact M of relay 274, contact M of transfer relay 301, conductor 350, winding of relay 310, contact B of counting relay 307', conductor 254, either contacts C of relay 605 or contacts C of relay 604 to ground on contact A of relay 607. Relay 310, upon operating, locks over a circuit extending from battery, winding and contacts A of relay 310, conductor 352, conductor 354 to the ground previously mentioned. At the same time that battery is applied to conductor M battery is also applied to conductor 277, causing the operation of pulsing relay 304 which may be traced from battery, common ring 261 of auxiliary distributor P2, brush arm 260, either segment 265 or 266, conductor 277, winding of pulsing relay 304, conductor 653, contact B of relay 605 to ground on contact B of relay 606. The operation of the pulsing relay completes a circuit for operating relay 305, one of the first pair of counting relays, which may be traced from battery, winding of relay 305, contacts A of relay 305' to ground on contacts of pulsing relay 304. Upon pulling up, relay 305 prepares a circuit for operating relay 305' but, as ground on the armature of pulsing relay 304 is connected to one terminal of the winding of relay 305' and ground on conductor 354 is connected to the other terminal of the winding of relay 305', this relay does not operate until pulsing relay 305 releases. When the pulsing relay does release, however, a circuit is completed from battery, winding and contact of relay 305, winding of relay 305' to grounded conductor 354. Relay 305 locks over this circuit and relay 305' operates. At its A contact relay 305' opens the operating circuit for relay 305, thus preventing relay 305' from being shunted by the subsequent operation of pulsing relay 304; at its B contact relay 305' prepares an operating circuit for relay 306; the effect of closing contact C of relay 305' will be mentioned later; at its D contact relay 305' completes an obvious circuit to operate transfer relay 301 which, as previously stated, connects each of the conductors P—O, S—N, and A—M to one of the relays in the two-letter stock selection group.

Consequently, when battery is next applied to conductor M relay 312, which is the M relay in the two-letter group, is operated over a circuit which extends from battery, common ring 261, brush arm 260, segments 265 or 266, conductor 241, contacts B of relay 270, contacts D of relay 271, contacts G of relay 272, contacts M of relay 273, contacts M of relay 274, conductor M, contacts M' of transfer relay 301, contacts M' of transfer relay 302, conductor 357, winding of relay 312, conductor 358, contacts C of relay 305', contact B of relay 307' to grounded conductor 354. Upon operating, relay 312 closes a circuit from battery, winding and contact A of relay 312, conductor 352 to grounded conductor 354. Upon the second application of battery to conductor 277, pulsing relay 304 is again operated over the circuit previously traced. The operation of pulsing relay 304 closes a previously prepared circuit for relay 306 which may be traced from battery, winding of relay 306, contact A of relay 306', conductor 359, contacts B of relay 305' to ground at armature of relay 304. Relay 306 then operates and when the pulsing relay is released, as distributor brush 260 leaves segment 265, a circuit is completed from battery, winding and contacts of relay 306, winding of relay 306', conductor 355, grounded conductor 354. Relay 306 locks and relay 306' operates over this circuit. At its A contacts relay 306' opens the operating circuit of relay 306, thus preventing relay 306' from being shunted by a subsequent operation of pulsing relay 304; at its B contact relay 306' prepares a circuit for operating relay 307; the effect of closure of contact C will be described presently; at its D contact relay 306' completes an obvious circuit for operating transfer relay 302. As previously mentioned, the operation of transfer relay 302 connects each of the first three groups of conductors P—O, S—N and A—M to one of the stock selection relays in the three-letter group.

Upon the third application of battery to conductor M, relay 314, which is the M relay in the three-letter group, is operated over a circuit which may be traced from battery, common ring 261, distributor brush 260, segments 264, 265 and 266, conductor 241, contact B of relay 270, contact D of relay 271, contact G of relay 272, contact M of relay 273, contact M of relay 274, contact M' of transfer relay 301, contact M'' of transfer relay 302, conductor 363, winding of relay 314, conductor 366, contact C of relay 306', contact B of relay 307', grounded conductor 354. Upon operating, relay 314 locks over a circuit that may be traced from battery, winding and contact A of relay 314, conductor 352 to grounded conductor 354. Upon the third application of battery to conductor 277, pulsing relay 304 is again operated over the circuit previously traced. Operation of pulsing relay 304 causes the operation of relay 307 over a circuit that may be traced from battery, winding of relay 307, contact A of relay 307', contact B of relay 306', contact B of relay 305' to ground on the armature of relay 304. Again, when the pulsing relay 304 releases, a circuit is completed from battery, winding and contact of relay 307, winding of relay 307', conductor 355 to grounded conductor 354, over which circuit relay 307 locks and relay 307' operates. At its A contact relay 307' opens the operating circuit of relay 307, thus preventing relay 307' from being shunted by a subsequent operation of the pulsing relay; at its B contact relay 307' opens the operating circuits of relay 310, 312 and 314 but, as these relays are locked, the opening of their operating windings is without effect; at its C contacts relay 307' completes an obvious operating circuit for transfer relay 303.

As a result of the operation just described, a circuit is prepared for operating the stock relay 801 which is associated with the indicating mechanism for posting quotations on the stock designated by the three letters MMM. This circuit may be traced from battery, winding of relay 801, conductor 370, contacts C of relay 314, contacts F of transfer relay 303, contacts C of relay 312, contacts C of relay 310, conductor 361, contacts A' of transfer relay 302, conductor 660 to a normally open contact B of relay 604.

The next signal transmitted will be that for selecting the open shelf. The "stunt" conductors 1–6, which are the fourth group of conductors controlled by the permutation unit Q, are the conductors over which the shelf selection is made. Conductor 1 is connected to the low shelf selecting relay 601; conductor 2 is connected to the high shelf selecting relay 602; conductor 3 is connected to the open shelf selecting relay 603; conductor 4 is connected to pulsing relay 502 which, as previously mentioned, serves to operate pair of counting relays 512 and 512' to start the positioning of the selecting indicators; conductor 5 is connected to the pulsing relay 606 which controls a pair of counting relays, 604 and 605; and conductor 6 is connected to release relay 607 whose function was previously explained.

The open signal causes battery to be connected to stunt conductor 3, upon which open shelf selecting relay 603 is operated over a circuit from battery, through common ring 261, brush arm 260, segment 264 or 265, auxiliary distributor P2, conductor 241, contact A of relay 270, contact A of relay 271, contact B of relay 272, contact C of relay 273, contact 3 of relay 274, conductor 3, winding of relays 603 and 606 to ground. Relays 603 and 606 operate and the former locks to ground over a circuit that may be traced from battery, winding and contact A, relay 603, conductor 650, contact A of relay 608, conductor 651, to grounded contact C of relay 607. Operation of relay 603 causes the high shelf relay 602 and the low shelf relay 601 to operate. The circuit for operating the high shelf relay may be traced from battery, winding of relay 602, contact B of relay 603 to grounded conductor 650. The operating circuit for low shelf relay 601 may be traced from battery, winding of relay 601, contact C of relay 603, to ground. Relays 601 and 602, upon being operated, lock through their A contacts to grounded conductor 650. At its B contact relay 603 extends ground over conductor 656, to the armature co-operating with the contact R of stock relay 801. The winding of auxiliary relay 802 is connected to contact R.

The operation of relay 606 completes a circuit from battery through contacts B of relay 607, winding of relay 604, contacts A of relay 605 and contacts A of relay 606 to ground. Relay 604 operates closing contacts A, B and D and opening contacts C and E. Closure of contacts A completes a path from battery through the winding and contacts A of relay 604, winding of relay 605, conductor 551 and contacts C of unoperated relay 503 to ground. This circuit is not yet effective since there is a shunt path to ground from the winding of relay 604 over contacts A of relay 605 to 606. Closure of contacts B of relay 604 supplies ground over conductor 660, and the contacts of the operated letter transfer and stock selection relays to operate the selected stock relay 801; opening of contact C removes ground from conductor 354 without effect however, since ground continues to be applied to this conductor over contacts C of relay 605; closure of contacts D of relay 604 completes a circuit from battery through the winding of relay 401, conductor 475, winding of relay 501, conductor 652, contacts D of relay 604 and contacts A of relay 607 to ground, operating relays 401 and 501 and transferring the first two permutation unit circuit groups P—O and S—N to the price selection relays; opening of contacts E of relay 604 removes ground from conductor 670 and the locking windings of the stock relays to insure the clearing out of the last selection. As soon as relay 801 operates relay 802 also operates due to the extension of ground from now grounded conductor 656 over contacts R of relay 801 to the winding of relay 802 and battery.

At this time, brush arm 260 leaves segment 265, opening the circuit through the permutation unit to relay 606 which releases and removes the short circuit mentioned from the winding of relay 605. Relay 605 operates, the opening of its contacts A breaking the short circuit path to relay 604 insuring that it will not be again short circuited during this cycle of operation of the board; the opening of contacts B breaking the circuit to the winding of letter pulsing relay 304 to prevent its operation during the price reception; the opening of contacts C removing ground from conductor 354 and the locking winding of the letter selection relays and letter counting relays and restoring them to normal in preparation for a new stock selection at the termination of the price selection; while the closing of contacts D restores ground to conductor 670 and the locking winding of the stock relay 801 just operated to retain it in its operated position.

The figure signals are now transmitted and due to the transfer mentioned above become effective on the price selection relay groups. The price assumed was 90⅝ and consequently the first signal received at the master board is that for the figure 9. This closes a circuit from battery through the permutation unit to contact O of relay 274 and thence over conductor O, contact 9 of operated relay 401, conductor 467, contact 9 of unoperated relay 402, conductor 464, operating (upper) winding of relay 419, bus conductor 450, winding of relay 404, conductor 451, contacts B of unoperated relay 407', bus conductor 650, contacts A of relay 608, conductor 651 and contacts C of relay 607 to ground. Relays 404 and 419 now operate and relay 419 locks over a locking circuit common to all the price selection relays, that is, from battery over contacts A and conductor 462 to grounded conductor 650. Closure of the remaining contacts of relay 419 is ineffective at this time and will therefore be considered hereinafter.

Closure of contacts A of relay 404 completes a circuit from battery through the winding of relay 405, contacts A of relay 405' and contacts A of relay 404 to ground. Relay 405 operates and its contacts A, B and C close. Closure of contacts A completes a circuit from battery through the winding and contacts A of relay 405 and the winding of relay 405' to grounded conductor 650. Relay 405' does not operate however until brush arm 260 leaves segment 265, releasing relay 404 and removing the short circuit from the winding of relay 405'.

Upon the operation of relay 405' the opening of contacts A of that relay prevents closure of the short circuit path from the winding of relay 405', closure of contacts B prepares relay 406 for operation and closure of contacts C completes a circuit from battery through the winding of relay 402, conductor 463 and contacts C of relay 405' to ground.

Relay 402 now operates transferring the permutation unit circuit to the second group of integer relays. It is to be noted that no effects occur at this time from the closing of contacts B and C of relay 405 and contacts D and E of relay 405'. The circuits completed by the closure of these contacts will be described subsequently.

Now the signal corresponding to the second figure of the price is received. The second figure of the assumed price is zero; the corresponding circuit of the permutation unit is closed completing a circuit from battery through the permutation unit to conductor P and thence through contacts O of relay 401, conductor 460, contacts O' of relay 402, conductor 489, contacts O' of relay 403, conductor 465, winding of relay 420, bus conductor 450, winding of relay 404, conductor 451 and contacts B of relay 407' to grounded conductor 650. Relay 420 locks operated in a manner already described in connection with relay 419. Pulsing relay 404 again operates closing a circuit from battery through the winding of relay 406 and contacts F of relay 406', contacts B of relay 405' and A of 404 to ground. Relay 406 operates and on the cessation of the impulse relay 406' operates. A circuit is completed from ground through contacts C of relay 406', conductor 466 and winding of relay 403 to battery. Relay 403 operates and transfers the permutation unit to the third integer, or units, group of relays.

The signal corresponding to the last figure of the price is now received. This figure is the fraction ⅝, consequently a circuit is completed from battery through the permutation unit, conductor B, contacts ⅝ of operated relay 501, conductor 559, operating winding of relay 509, bus conductors 555 and 550 and the winding of relay 502 to ground. Relays 502 and 509 now operate, relay 509 locking to grounded bus conductor 650 as explained in connection with the other price selection relays. Closure of contacts A of relay 502 completes a circuit from battery through the winding of relay 503, and contacts A of relays 503' and 502 to ground. Relay 503 now operates; closure of its contacts A prepares a circuit for operating relay 503'; opening of its contacts C removes ground from conductor 551 and the windings of relays 605 and 604. Relays 605 and 604 de-energize but relay 604 first restores to normal position since 605 is slow releasing. The de-energization of 604 releases relays 401 and 501, transferring the permutation unit circuits to the stock selection circuits, restores ground to the stock selection relays and letter counting relay locking windings, and closes the circuit to the locking windings of the stock relays as 801 at contacts E. Relay 605 restores but without effect since the de-energization of 604 has already served to restore ground to the stock-selection and letter counting relays and to retain ground on the stock relay locking windings.

Closure of contacts B of relay 503 completes a number of parallel circuits as follows:

1. From ground at contacts B of relay 503 over conductor 552, contacts C of relay 405, conductor 476, contacts D of relay 406, conductor 477, contacts G of unoperated relay 407, contacts H of relay 407, conductor 485, contacts F of relay 419, conductor 481 to tap K (associated with figure 9) of the tens potentiometer 902.

2. From ground at contact B of relay 503 over conductor 552, contacts C of relay 405, conductor 476, contacts D of relay 406, conductor 477, contacts G of unoperated relay 407, conductor 484, contacts E of operated relay 420 of the tens group and over conductor 482 to the first tap A (associated with the figure zero) of the units potentiometer 903.

3. From ground at contact B of relay 503 over conductor 552', contacts C of relay 509 and conductor 560 to tap F of the fractions potentiometer (associated with the fraction ⅝).

Completion of the various circuits mentioned above will, in cooperation with the polar relays of Figure 10, control the connections to the transmitter of Figure 1. Since the "open" signal has already prepared both the high and low shelf relays for operation any alteration of the transmitted signal will be ineffectual at this time and therefore the description of this feature will be given hereinafter. The fractions circuit of the permutation unit now opens due to brush arm 260 leaving segment 265. This de-energizes relay 502 which restores to normal removing the short circuit from the winding of relay 503' which consequently operates in series with relay 503.

Closure of contacts D and E of relay 503' may complete either of the following circuits:

1. From ground through the armature and contacts S of any operated relay (it is impossible to know which relays are operated at the time and immaterial moreover) of the high polar relay group comprising relays 1001, 1002, 1003 and 1004, conductor 1050, contacts E relay 503', contacts D relay 512' and conductor 561 to the fourth spacing contact 139 of transmitter 101.

2. From ground through the armature and contacts M of any operated relay of the low polar relay group comprising relays 1005, 1006, 1007, 1008, conductor 1051, contacts D of relay 503', contacts C of relay 512' and conductor 562 to the fifth spacing contact 140 of transmitter 101.

The next code symbol prepared for transmission is the start symbol which corresponds to a signal comprising five spacing impulses. The start signal will be altered to the start-high signal if ground is on the fourth armature of the transmitter and to the start-low signal if ground is at the fifth armature. Whether the signal is or is not altered is immaterial at this time since both the high and low shelf relays 602 and 601, respectively, have been operated and since reception of a high, a low or an unmodified start signal will cause a circuit to be closed to operate relay 502. The three possible circuits to effect this result are:

1. If the start signal is transmitted a circuit will be closed from battery through the permutation unit and conductor 4 to conductor 550 and through the winding of relay 502 to ground.

2. If the start-high signal is transmitted a circuit will be completed from battery through the permutation unit over conductor 2 to the operating winding of high shelf relay 602 and thence over conductors 4 and 550 to the winding of relay 502 and to ground. It is to be noted that relay 602 was operated when the open relay operated and that consequently the only new effect of the start-high signal is the operation of relay 502.

3. If the start-low signal is transmitted a circuit will be completed from battery through the permutation unit, conductor 1, operating winding of low shelf relay 601, conductors 4 and 550 to the winding of relay 502 and to ground. Again the only new effect is the operation of relay 502 since relay 601 was operated when the open relay operated at the reception of the open signal.

Operation of relay 502 completes a circuit from battery through the winding of relay 512, contacts A of relay 512', contacts B of relay 503' and contacts A of relay 502 to ground.

Relay 512 now operates closing its locking contacts A but without effect since the path through contacts A of relay 502 forms a short circuit around the locking contacts of relay 512 and the winding of relay 512'. When the start signal terminates relay 502 releases opening its contacts A and removing the short circuit from relay 512' which now operates in series with relay 512.

Operation of relay 512' breaks the circuits to the spacing contacts of the transmitter due to opening of contacts C and D and thus restores the transmitter connections to normal.

Opening of contacts A of relay 512' assures that a subsequent operation of relay 502 will not short out relay 512'.

Closing of contact B of relay 512 places ground on conductors 563 and 564 completing a group of circuits enumerated below.

1. From battery through indicator clutch magnet 812, conductor 851, contact F of relay 801, conductor 874, contacts B of relay 718, conductor 453, contacts B of operated relay 406, conductor 454 and contacts B of operated relay 405, conductor 563 and contacts B of relay 512' to ground.

2. From battery through indicator clutch magnet 813, conductor 852, contact G of relay 801, conductor 875, contact B of relay 722, conductor 454 and contact B of relay 405 to grounded conductor 563 (grounded as explained in (1) above).

3. From battery through indicator clutch magnet 814, conductor 853, contacts H of relay 801, conductor 876, contacts B of relay 726, conductor 564, and conductor 563 to ground at contacts B of relay 512'.

4. From battery through the tens indicator clutch magnet 816 of the low shelf, through conductor 855, contacts K of relay 801, conductor 878, contacts C of low shelf relay 601, conductor 872 to conductor 874 which is grounded as explained in (1) above.

5. From battery through the low shelf units indicator clutch magnet 817, conductor 856, contacts L of relay 801, conductor 879, contacts D of relay 601, conductor 873 to conductor 875 which is grounded as was explained in (2) above.

6. From battery through fractions indicator clutch magnet 818, conductor 857, contacts M of relay 801, conductor 880, contacts E of relay 601 and conductor 873 to conductor 876 which is grounded as was explained in (3) above.

7. From battery through the high shelf tens indicator clutch magnet 820, conductor 863 and contacts B of operated relay 802 to conductor 874 which is grounded as was explained in (1) above.

8. From battery through the high shelf units indicator clutch magnet 821, conductor 864 and contacts C of relay 802 to conductor 875 which is grounded as explained in (2) above.

9. From battery through the high shelf fractions indicator clutch magnet 822, conductor 865 and contacts D of relay 802 to conductor 876 which is grounded as explained in (3) above.

10. From battery through the open shelf tens indicator clutch magnet 824, conductor 870 and contacts F of relay 802 to conductor 878 which is grounded as explained in (4) above.

11. From battery through the open shelf units indicator clutch magnet 825, conductor 871 and contacts G of relay 802 to conductor 879 which is grounded as explained in (5) above.

12. From battery through the fractions indicator clutch magnet of the open shelf 826 through conductor 872 and contacts H of relay 802 to conductor 880 grounded as explained in (6) above.

Due to the completion of these twelve circuits the indicator clutch magnets associated with the tens, units and fractions figures of the high, low, open and last shelves operate and attract the indicator drums to positions to be driven by the constantly rotated driving shafts, as previously explained. Since there is a driving means for each order of figures of the price, indicator drums 828, 832, 836 and 840 are driven by shaft 733; indicator drums 829, 833, 837 and 841 by shaft 734; and the fractions indicator drums 830, 834, 838 and 842 are driven by shaft 735. It can be seen also that the operation of the high and low shelf register clutch magnets lowers the wipers N of the rotary switches 803–806 and 807–810 so that they are out of engagement with the rotary switch contacts as they are driven by the corresponding register drums.

Figure 7:
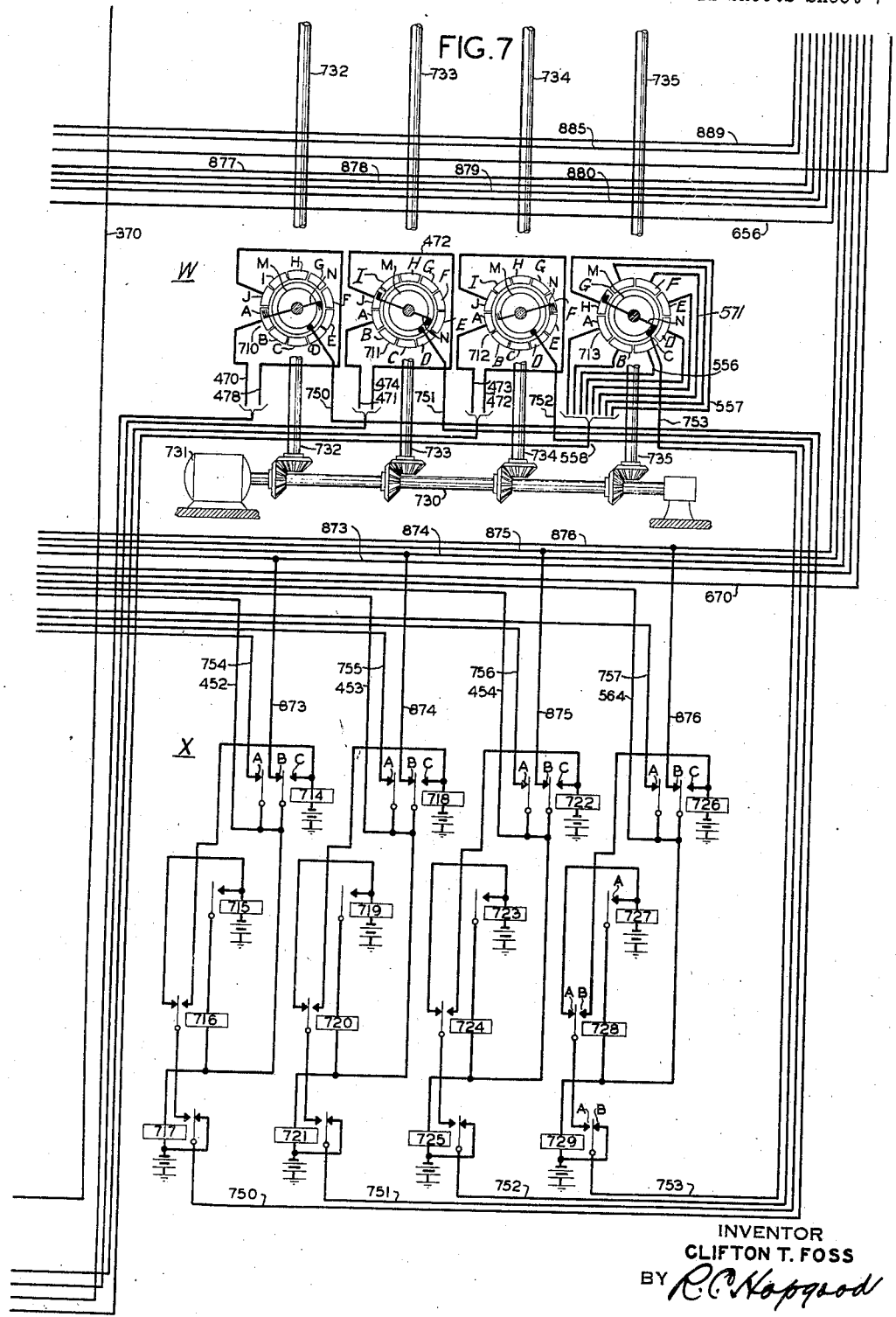
Figure 7 illustrates the commutators and associated counting relays for controlling the release of the indicator clutch magnets together with a continuously operable motor and the driving shafts actuated thereby.

Returning now to the price selection circuits, it will be seen that each relay of the hundreds digit selection group of figure 4 has three sets of contacts B, C and D which are associated with the commutators of figure 7. One set of contacts extends to a segment of the commutator 710 associated with the hundreds indicators, a second to a corresponding segment of the commutator 711 associated with the tens indicator, and a third to a corresponding segment of the commutator 712 associated with the units indicators.

Each relay of the tens digit group has two sets of contacts B and C which are connected to the commutators, contacts B being connected to a segment of the tens commutator 711, and contacts C being connected to a corresponding segment of the units commutator 712.

Each relay of the units digit group has a single contact connected to the commutators, this contact D being connected to a segment of the units commutator 713.

The common rings M of the commutators 710, 711, 712 and 713 are connected by conductors 750, 751, 752 and 753, respectively, to the armatures of relays 717, 721, 725 and 729. Also the winding of relay 717 is connected through the common conductor 452 to a contact B of relay 407 and, when relays 405–407' and 512' are operated, through contact B of relay 407, conductor 453, contact B of relay 406, conductor 454, contact B of relay 405, conductor 563 and contact B of relay 512' to ground.

Similarly, the winding of relay 721 is connected over conductor 453 to contact B of relay 406 and, when that relay and relays 405 and 512' are operated, over contact B of relay 406, conductor 454, contacts B of relay 405, conductor 563 and contacts B of relay 512' to ground.

Likewise the winding of relay 725 is connected over conductor 454 to contact B of relay 405 and, when both that relay and relay 512' are operated, over contacts B of relay 405, conductor 563 and contact B of relay 512' to ground.

It has previously been shown that upon the reception of the assumed price, 90⅝, three price selection relays were operated. These relays are 419, the last relay of the hundreds group, relay 420, the first relay of the tens group, and 509, the sixth relay of the fractions group. It has also been shown that when three price selecting signals, as in the present case, are transmitted, the first two pairs of integer counting relays 405–405' and 406–406' are operated, though in addition two pairs of counting relays 503 and 503' associated with the fractions price selection relays are also operated. Consequently, upon the operation of relay 512', ground is applied to a predetermined segment on each of the three commutators 711–713, but not to a segment on commutator 710. Segment J of commutator 711 is grounded over a circuit extending from ground at contact B of relay 512', conductor 563, contact B of relay 405, contact B of relay 406, contact C of relay 407, contact D of the same relay, conductors 457, contact C of relay 419, conductor 474, to segment J of commutator 711; segment A of commutator 712 is grounded over a circuit extending from ground at contact B of relay 512', conductor 563, contact B of relay 405, contact B of relay 406, contact C of relay 407, conductor 458, contact C of relay 420, conductor 473, to segment A of commutator 712; and segment F of commutator 713 is grounded over a circuit extending from ground on contact B of relay 512', conductor 564, conductor 553, contact B of relay 509, conductor 571 to contact F of commutator 713. Likewise when relay 512' is energized, ground is extended over conductors 453, 454 and 564 to the windings of relays 721, 725 and 729, respectively. It is to be understood, of course, that only when four price selecting signals are transmitted, and the three pairs of counting relays 405–407' consequently operated, that ground is placed on a segment of commutator 710 and ground is connected to the winding of relay 717 over conductor 452. The circuit for relay 721 may be traced from battery, winding of relay 721, conductor 453, contact B of relay 406, contact B of relay 405, conductor 563 to contact B of relay 512'; the circuit for relay 725 may be traced from battery, winding of relay 725, conductor 454, contact B of relay 405, conductor 563 to ground at contact B of relay 502'; and the circuit for relay 729 may be traced from battery, winding of relay 729, conductor 564, conductor 563 to ground at contact B of relay 512'.

As the co-operation of commutator 711 and the associated counting relays 718–721 in controlling the positioning of the selected tens indicators 840, 836, 832 and 828 is typical, their operation will alone be described. Upon the operation of relay 512' the brush N of commutator 711 may either be on or off the grounded segment J. If the brush N is then on segment J, relay 721 is not operated as its winding is then shunted out, one terminal of the winding being grounded at contact B of relay 512' over the circuit including conductor 453 just traced, and the other terminal being grounded at the same contact but over a different circuit that may be traced from battery, contact B of relay 721, conductor 751, common ring M of commutator 711, brush N, segment J and then through contact C of hundreds relay 419, as previously traced, to ground at contact B of relay 512'. When the brush N moves off segment J, or if it is not on segment J when relay 512' is operated, relay 721 is energized over the circuit just traced through segment J of commutator 711.

When brush N again reaches segment J, relay 719 is operated over a circuit that may be traced from battery, winding of relay 719, contact A of relay 720, contact A of relay 721, conductor 751, segment J of commutator 711, and thence to ground at contact B of relay 512' over the circuit previously traced. The operation of relay 719 prepares through its contacts a circuit for operating relay 720, but this relay cannot operate until brush N leaves segment J as both terminals of its winding are grounded, one terminal being grounded over conductor 453 and the other at segment J of commutator 711. However, when brush N leaves segment J, relay 720 operates over conductor 453 and relay 719 locks over the same conductor. When brush N again reaches segment J relay 718 operates over a circuit that may be traced from battery, winding of relay 718, contact B of relay 720, contact A of relay 721, and then over conductor 751 and the remainder of the circuit previously traced to ground at contact B of relay 512'. Upon operating, relay 718 opens its A and B contacts, and locks through its contact C to the grounded conductor 453. It is to be noted that contacts A and B of relay 718 are opened at the time brush N of commutator 711 reaches the grounded segment J.

It was previously explained that the low shelf relay 601, the high shelf relay 602, and the open shelf relay 603 were operated by the open shelf selecting signal, and that open shelf relay 603 causes the operation of auxiliary relay 802. Consequently the operating circuits for the clutch magnets of the tens indicators 836 and 828 on the high and low shelves, respectively, are multipled to conductor 874 which extends through contact B of relay 718 and is then connected to the grounded conductor 453; the operating circuits for the clutch magnets of the units indicators 837 and 829 on the high and low shelves, respectively, are multipled to conductor 875 which is connected through contact B of relay 722 to the grounded conductor 454, the operating circuits for the clutch magnets of the fractions indicators 838 and 830 on the high and low shelves, respectively, are multipled to conductors 876 which is connected through contact B of relay 726 to the grounded conductor 564; the operating circuits for the clutch magnets of the tens indicators 840 and 832 on the open and low shelves, respectively, are multipled to conductor 878, which is connected through contacts C of relay 601, conductor 672, contact B of relay 718 to grounded conductor 453; the operating circuits for the clutch magnets of the units indicators 841 and 833 on the open and low shelves, respectively, are multipled to conductor 879 which is connected through contacts D of relay 601, conductor 673, contact B of relay 722 to grounded conductor 454; and the operating circuit for the clutch magnets of the fractions indicators 842 and 834 on the open and low shelves, respectively, are multipled to conductor 880, which is connected through contacts E of relay 601, conductor 674, contact B of relay 726 to grounded conductor 564. From the circuits just traced it is obvious that the opening of contact B of relay 718 will release the clutch magnets of the tens indicators 840, 836, 832 and 828; that the opening of contact B of relay 722 will release the clutch magnets of the units indicators 841, 837, 833, and 829, and that the opening of contact B of relay 726 will release the clutch magnets of the fractions indicators 842, 838, 834 and 830.

As relay 718 thus causes the clutch magnets of the tens indicators 840, 836, 832 and 828 to release when brush N of commutator 711 reaches grounded segment J, and as the indicators are locked in their position of release, as previously explained, it follows that each of the tens indicators has been set to display the same digit and that this digit corresponds to segment J on commutator 711. Now the digits on the periphery of the tens indicator are so arranged that when their clutch magnets are released at the time brush N is on segment J the digit 9 is displayed. Also when their clutch magnets are released at the time brush N is on the segments A—I the digits 0—8, respectively, are displayed. The digits on the peripheries of the hundreds and units indicators are similarly arranged with respect to the segments on commutators 710 and 712, respectively. The blank and the fractions on the fractions indicators are arranged so that when their clutch magnets are released at the time brush N of commutator 713 is on segment A the blank is displayed, and when their clutch magnets are released at the time brush N is in segments B—H the fractions ⅛—⅞, respectively are displayed. From the above description it is evident that all of the tens indicators have been positioned to display the digit 9.

As segment A of commutator 712 has been grounded, it is evident that the clutch magnets of the units indicators 841, 837, 833 and 829 will be released by the operation of relay 732 at the time that brush N of commutator 712 is on segment A. It, therefore, follows that the blank or a zero will be displayed on all of the units indicators.

As segment F of commutator 713 has been grounded, it is evident that the clutch magnets of the fractions indicators 842, 838, 834 and 830 will be released by the operation of relay 726 at the time that brush N of commutator 713 is in segment F. It likewise follows here that the fraction ⅝ will be displayed by the fractions indicators. It is also evident from the operation of relays 718–721 that relay 719 is operated when the brush N of commutator 711 traverses the grounded segment either the first or the second time, and that relay 718 is operated when brush N traverses the grounded segment for either the second or the third time. To traverse the grounded segment twice, brush N must make at least one complete revolution, or what is the same thing, shaft 733 must make at least one complete revolution. Consequently, it is evident that the driving tooth 1127 must always engage the driven tooth 1128 attached to the indicators, thus insuring that the indicators will always be positively driven.

From the previous explanation, it will also be apparent that the wipers N of rotary switches 808 and 804 will be stopped on contacts J, the wipers N of rotary switches 809 and 805 will be stopped on contacts K, and the wipers N of rotary switches 810 and 806 will be stopped on contacts F.

Thus under the price assumed the display on each shelf of indicators is 90⅝ and in addition the switch arms of the rotary switches associated with the operated indicators on the high and low shelves are set to position corresponding to the price posted in which positions they will remain until the next high or low quotation for the same stock is received. It is to be noted that all of the rotary switch wipers are not shown in the positions described.

Operation of relays 718, 722 and 726 also opens at their respective contacts A the circuits through the conductors 755, 756 and 757 to the associated windings of relays 609 and 610. Contacts A and B of both relays then open, breaking the circuit through the winding of relay 608. Since, however, relay 608 is slow releasing the multipled contacts A of relay 608, A and B of relay 609, A and B of relay 610 are now all open, bus conductor 650 and associated conductor 462 is no longer grounded and relays 405, 406, 407, 503 and all the operated relays of the price selection groups release and restore to normal.

Relay 503' is also de-energized at this time, but due to its slow releasing characteristic it releases after relay 503. Ground is thus retained continuously on conductor 551 to prepare relays 604 and 605 for operation when the figure signal of the next quotation is received.

*Automatic transmission and posting of the "new high" price*

The indicator drums and rotary switches are now set up as was explained to display and record the open price which is, of course, both a new high and a new low. Consequently the next price must be either a new high or a new low. We will consider it to be a new high and the value to be 99⅓. The stock selection would be exactly the same as was described previously. After the stock selection is sent, the next signal will be that for the figure shift. This signal will complete a circuit from battery through common ring 261, brush arm 260 and segment 264 of the receiving distributor, conductor 241 and through the permutation unit to contact 5 of relay 274 and thence through conductor 5, conductor 655, and the winding of relay 606 to ground. Relay 606 will operate and will complete a circuit from battery through contacts B of unoperated relay 607, winding of relay 604, contacts A of relay 605 and contacts A of relay 606 to ground, causing energization of relay 604. In response to the operation of relay 604, the transfer relays 401 and 501 will be operated over a circuit previously traced, to disassociate the first three groups of conductors P—O, S—N and A—M from the stock selection relays and to associate the first two mentioned groups with the price selection relays. Operation of relay 604 will lock the operated stock relay 801 in its operated position and will also cause the release of the letter selection relays in the same manner as was explained when the operation of relay 604 on the open signal was considered.

Figure 9:
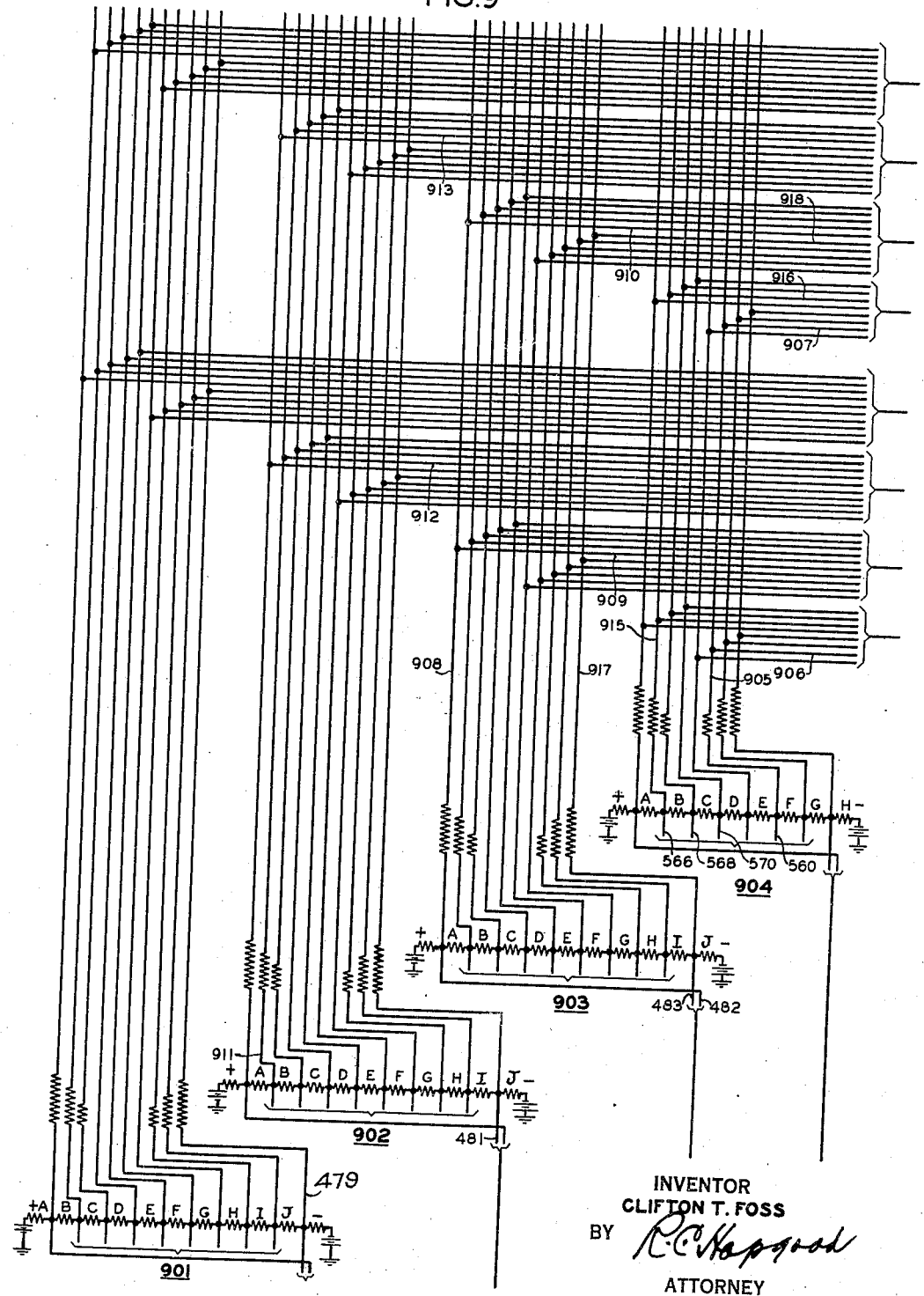
Figure 9 illustrates the potentiometers for controlling the shelf selecting relays of Fig. 10.

Next, the price signals will be received, the first price signal being that of the units figure 9 since this is the highest order of figure the value of which is different in the new price from its value in the opening price. Reception of the signal corresponding to the figure nine will close a circuit from battery through the permutation units, conductor O, contact 9 of relay 401 (which is now operated), contact 9 of relay 402, conductor 464 and through the winding of relay 419 of the hundreds group, conductor 459 and the winding of relay 404 to conductor 451 which is now grounded. Relay 419 will operate and lock in its operated position and relay 404 will also operate, completing a circuit from battery through the winding of relay 405, contacts A of relay 405' and contacts A of relay 404 to ground. At the cessation of the signal the permutation unit circuit will be opened and relay 404 will release, removing the short circuit from the winding of relay 405' and permitting that relay to operate due to the completion of the circuit from battery through the winding and locking contacts A of relay 405, and the winding of relay 405' to grounded conductor 650.

Due to the operation of relay 405', circuits are completed through the operating windings of units polar relays 1003 and 1007 as will be described.

The next signal received will be that corresponding to the fraction ⅛. This will complete a circuit from battery through the permutation unit to contacts C of relay 274 and thence through conductor C, contact ⅛ of relay 501, conductor 569, the operating winding of relay 505, conductor 555 and conductor 550 to the winding of relay 502 and ground. Relays 505 and 502 now operate, relay 505 locking in its operated position as described previously. The operation of relay 502 completes a circuit through the winding of relay 503 which now operates.

It has previously been explained that the counting relays 405—407' determine whether a tap in one or more of the potentiometers 901—903 is to be grounded, and also whether operating circuits for the hundreds, tens and units relays in the high and low shelf groups of Fig. 10 are to be completed. It has also been explained that the operating circuits for the fractions relays in the high and low shelf groups are completed when the stock relay, as 801, is operated. As in the previous explained grounding of predetermined segments of commutators 710—713, the price selection relays prepare circuits for grounding predetermined taps in potentiometers 901—914, and the selected taps are then grounded simultaneously by the operation of a single relay, in this case, the counting relay 503 associated with the fractions price selection relays.

In posting the assumed new high quotation, but two price selecting signals are transmitted, namely one for selecting relay 419 and the other for selecting relay 505. Consequently only the first pair of counting relays 405 and 405' are operated.

As soon as the stock relay 801 is operated the following circuits are prepared:

1. Tap F of fractions potentiometer 904, bus conductor 905, conductor 906, contact F of the fractions rotary switch 806 on the low shelf (the wiper N having been previously set to contact F in posting the opening fraction of ⅝), wiper N, common ring M, conductor 861, contact N of stock relay 801, conductor 885, to ground through the operating winding of relay 1008.

2. Tap F of fractions potentiometer 904, bus conductor 905, conductor 907, contact F of the fractions rotary switch 810 on the high shelf, wiper N and common ring M of that switch, conductor 868, contact A of stock relay 801, conductor 889 and to ground through the operating winding of relay 1004.

When the first pair of counting relays 405 and 405' are operated the following circuits are prepared:

1. Tap A of units potentiometer 903, bus conductor 908, conductor 909, contact A of units rotary switch 805 of the low shelf (to which contact wiper N was set in posting the units digit of the opening price), wiper N and common ring M of that switch, conductor 860, contacts O of stock relay 801, conductor 884, contact D of relay 405', conductor 486 and to ground through the operating winding of relay 1007.

2. Tap A of units potentiometer 903, bus conductor 908, conductor 910, contact A of fractions rotary switch 809 on the high shelf, wiper N and common ring M of that switch, conductor 867, contact B of stock relay 801, conductor 888, contacts E of relay 405', conductor 487, and to ground through the operating winding of relay 1003.

It is obvious that until the potentiometers 903 and 904 are upset by the grounding of a predetermined tap as a result of the operation of relays 419 and 505, respectively, and the operation of relay 503, no effective current will flow over the four circuits first traced. However, upon the operation of relay 503 tap J of potentiometer 903 is grounded over the following circuit: ground at contact B of relay 503, conductor 552, contact C of relay 405, contacts E of relay 406, conductors 490, contact G of relay 419, conductor 483 to tap J of potentiometer 903.

Also upon the operation of relay 503 tap B of potentiometer 904 is grounded over the following circuit: ground at contact B of relay 503, conductor 552', contact C of relay 505, conductor 566 to tap B of potentiometer 904.

Consequently as grounded tap B of potentiometer 904 is nearer to positive battery than the tap F to which the operating circuits of relays 1004 and 1008 are connected, negative battery will flow through the operating windings of each of these relays. As previously explained, negative potential flowing through the operating winding of relays 1004 and 1008 causes these relays to move their armatures to their M contacts with the result that conductor 1051 is grounded but conductor 1050 is not. As grounded tap J of potentiometer 904 is nearer to negative battery than tap A to which the operating circuits of relays 1003 and 1007 are connected, positive battery will flow through the operating windings of these relays. As a result, relays 1003 and 1007 move their armatures to their S contact, relay 1003 thereby grounding conductor 1050. When the armature of relay 1007 reaches its S contact, the circuit of the biasing winding of relay 1008 is closed, thus causing relay 1008 to close its S contact thereby removing ground from conductor 1050. It is thus evident that the operation of the pair of relays of the highest order, as in this case relays 1003 and 1007, determines whether conductor 1050 or conductor 1051 is to be grounded.

At this time, the fractions signal ceases and the circuit through the permutation unit to relay 502 is broken, releasing relay 502 and removing the short circuit from the winding of relay 503'. Relay 503' now operates and closure of its contacts E extends ground (the application of which to this contact has just been described), through contacts D of relay 512' and conductor 561 to the fourth spacing contact 139 of transmitter 101. This ground also extends thru the lamp 142 to battery lighting the lamp and indicating that a new high price is to be posted. In addition, closure of contacts B of relay 503' prepares a circuit over which relay 512 will shortly operate. Closure of contacts C of relay 503' restores ground to the winding of relay 605, so that that relay may operate when the next figure shift signal is received.

At this time a start signal is transmitted. This start signal, as has been explained, is the blank signal of the printing telegraph code and comprises five spacing impulses. Since the armatures 119—123 of transmitter 101 are held to the non-grounded contacts 136—140 when such a signal is being transmitted, five impulses of positive polarity would normally be transmitted over conductor 150. However, it has been shown that in this instance contact 139 is grounded. Consequently, the start signal is altered to the start-high signal.

The start-high signal causes closure of a circuit through the permutation unit which permits a current flow from battery to contact 2 of relay 274 and thence over conductor 2, the winding of relay 602, conductor 550 and winding of relay 502 to ground. Relay 502 now operates and completes a circuit from battery through the winding of relay 512, contacts A of relay 512', contacts B of relay 593' and contacts A of relay 502 to ground. Relay 512' now operates, completing a path from battery through its winding and locking contacts A and winding of relay 512' to grounded conductor 650. Relay 512' does not yet operate due to the short circuit path around its winding described previously. Upon the cessation of the start-high impulse, the permutation unit circuit is opened permitting opening of contacts A of relay 502, thus removing the short circuit from the winding of relay 512' and causing operation of that relay. The opening of contacts A of relay 512' assures that that relay will not again be shorted out prior to the completion of this cycle of operation of the board. The opening of contacts C and D of relay 512' breaks the connections to contacts 139 and 140 of the transmitter, thus assuring that no signal other than the start signal can at any time be effected by the grounding of these conductors and also extinguishing the indicating lamp 142. Closure of contact B of relay 512' completes a number of circuits enumerated below:

1. From battery through indicator clutch magnet 814, conductor 853, contacts H of relay 801, conductor 876, contacts B of relay 726 and conductors 564 and 563 to grounded contacts B of relay 512'.

2. From battery through indicator clutch magnet 813, conductor 852, contacts G of relay 801, conductor 875, contacts B of relay 722, conductor 454, contacts B of relay 405, conductor 563 to grounded contacts B of relay 512'.

3. From battery through indicator clutch magnet 822, conductor 890 and contacts D of relay 802 (which has operated due to the completion of a circuit through its winding from battery to conductor 891, contacts R of relay 801, conductor 656 and contacts A of relay 602 to grounded conductor 650) to conductor 876 which is grounded as was described in (1) above.

4. From battery through indicator clutch magnet 821, conductor 864 and contacts C of operated relay 802 to conductor 875, which is grounded as was described in (2) above.

It is noted that no circuits to indicator clutch magnets 811, 812, 819 and 820 are completed at this time due to the fact that the price contained but one integer, and consequently relays 406, 406', 407, 407' are not operated. It will also be noted that none of the indicator clutch magnets of the open or low shelves are operated, since relay 601 was not effected by reception of the start-high signal and consequently circuits from its contacts B, C, D and E to the open and low shelf magnets were not completed.

Due to the completion of the circuits through the units and fractions magnets of the high and last shelf registers, these magnets are operated, and attract the indicator drums associated therewith to their lower positions, causing them to start revolving in unison with associated drive shafts 734 and 735.

Circuits are also completed to the selected segments of the units and tens commutators of Figure 7 and consequently the register clutch magnets of the units and tens orders are released at predetermined positions depending on the grounding of these segments. Operation of the commutators will not be described since it is obvious from the description of these circuits given, when the open price was considered, that they will function in the same manner for any other price. In this particular instance, segment A of the units commutator 712 will be grounded and segment B of the fractions commutator 713 will likewise be grounded.

Thus following the transmission of a price which is higher than the preceding high price, the indicator drums of the current and high shelf, will be set to new positions to display a new high price due to the automatic alteration of a start signal to a start-high signal which selects the indicator drums of the high shelf for operation. The display of the open shelf will now be 90⅝, that of the high shelf 99⅛, that of the low shelf 90⅝, that of the current shelf 99⅛. In addition, rotary switches of the high shelf will have been re-set from their former positions to the position coresponding to the new high price just received. These positions will be as follows: Wiper N of the tens switch 808 will rest on contact J corresponding to the Figure 9; wiper N of switch 809 will rest on its contact J corresponding to the Figure 9; wiper N of switch 810 will rest on its contact B corresponding to the fraction ⅛.

It has been shown that when a new high price is received, circuits are established through the rotary switches from taps of the potentiometers to operate the polar relays of Figure 10 in such a manner that they cause a lamp to light thereby indicating the direction of change and subsequently alter a definite start signal into a start-high signal which causes selection of the registers of the high shelf of the master board for operation in unison with the registers of the current shelf.

*Automatic transmission and posting of a "new low" price*

Let it be assumed that the price of the particular stock considered, now falls to 90⅜. This price is lower than the previous low (90⅝), and will therefore affect the indicators of the low shelf. Following the stock selection, the figure shift signal will be transmitted and will cause the operation of relay 606 in the same manner as has been before described. The operation of relay 606 will cause the operation of selected stock relay 801 and will lock that relay in its operated position, release the letter selection relays and letter counting relays and transfer the permutation unit circuits from the stock selection relays to the price selection relays. The next signal received will be that for the figure zero, since it is necessary to transmit only the figures of the highest order the value of which is different in the new price and the last preceeding price and the lower orders. Thus in this instance the highest order of figure having a new value different from the old is the units order consequently its new value, zero, is first transmitted. Reception of the signal corresponding to the figure zero will cause the closure of the corresponding circuit of the permutation unit. Current will then flow from battery through the permutation unit to contact P of relay 274 and thence through conductor P and contact zero of operated relay 401, conductor 460, contact zero of relay 402, conductor 461, the operating winding of relay 410, conductor 450, winding of relay 404 to grounded conductor 451. Relays 410 and 404 will operate and relay 410 will lock in its operated position over a locking circuit which has been before described. Integer counting relay 405 operates at this time and relay 405' operates on cessation of the signal corresponding to the figure zero. Although contacts D and E of relay 405' close at this time, this closure is ineffective since as before, no alteration of the transmitted signals can take place due to the unoperated condition of relay 503' through the contacts of which the circuits from the polar relay armatures extend to the fourth and fifth spacing contacts of the transmitter.

The next signal received will be that for the fraction ⅜. This will complete a circuit through the permutation unit over a path from battery through contacts V of relay 274, conductor V, contacts ⅜ of relay 501, conductor 554, operating winding of relay 507, conductor 555, conductor 550 and winding of relay 502 to ground. Relays 507 and 502 will operate, relay 507 locking to ground. Operation of relay 502 completes a circuit through winding of relay 503 which now operates and completes through its contacts B a number of circuits as follows:

1. From ground through contacts B of relay 503, conductor 552, contacts C of relay 405, conductor 476, contacts E of un-operated relay 406, conductor 490, contacts G of relay 410, conductor 482 to tap A of the units potentiometer 903.

2. From ground through contacts B of relay 503, conductor 552', contacts C of relay 507, conductor 570 to tap D of the fractions potentiometer 904.

3. From negative battery through the right hand portion of the fractions potentiometer 904 to tap F of that potentiometer and thence through bus conductor 905, conductor 906, contact F of fractions rotary switch 806 of the low shelf, wiper N and common ring M of that switch, conductor 861, contacts N of relay 801, conductor 885 and the operating winding of relay 1008 to ground.

4. Since one terminal of the operating winding of relay 1007 is grounded and since the other terminal is connected thru the wiper and common ring of rotary switch 805 to tap A of potentiometer 903 which is grounded through contact G of relay 410, it will be seen that ground is applied to both terminals of the operating winding of the units polar relay 1007 of the low group and consequently that relay is inoperative at this time.

5. From positive battery through the left hand portion of fractions potentiometer 904 to tap B of that potentiometer and thence over bus conductor 915, conductor 916, contact B of fractions switch 810 of the high shelf, wiper N and common ring M of that switch, conductor 686, contacts A of relay 801, conductor 889 and the operating winding of relay 1004 to ground.

6. From negative battery through the right hand portion of units potentiometer 903 to tap K of that potentiometer and thence over bus conductor 917 and conductor 918, contact K of units switch 809 of the high shelf, wiper N and common ring M of that switch, conductor 867, contacts B of relay 801, conductor 888, contacts E of relay 405, conductor 487 and the operating winding of relay 1003 to ground.

Due to the application of negative battery to the operating winding of relay 1008, the armature of that relay moves to its contact M and since the winding of relay 1007 is grounded at both terminals as explained, that relay armature remains in its center position. Ground is now supplied from the armature of relay 1008 through contact M of that relay to conductor 1051.

Because of the application of positive battery to the operating winding of relay 1004, the armature of that relay tends to move to its spacing contact. However, negative battery is applied to the operating winding of relay 1003 the armature of which moves to its contact M, and thus completes a circuit from positive battery through the biasing winding of relay 1004 and contact M of relay 1003 to ground. The current through the biasing winding of relay 1004 predominates and causes the armature of that relay to move to its contact M in spite of the tendency previously mentioned to move to contact S. Consequently, ground is not applied to conductor 1050.

Now, due to the cessation of the signal corresponding to ⅜, the permutation unit circuits are broken and relay 502 is deenergized, removing the short circuit from winding of relay 503' and permitting that relay to operate. Operation of this relay completes the circuit from the grounded conductor 1051 through contacts D of relay 503', contacts C of unoperated relay 512', conductor 562 to the fifth spacing contact 140 of the transmitter 101. Also a circuit is completed through low indicating lamp 141 to show that the next price posted will be a new low. The start signal next to be transmitted is altered, due to the ground on the contact 140 (as explained) to the start-low signal. Reception of the start-low signal causes completion of the circuit from battery through the permutation unit to contact I of relay 274 and thence over conductor I, the operating winding of relay 601, conductor 550 and the winding of relay 502 to ground. Relay 502 operates. Closure of contacts A completes a circuit through the winding of relay 512 which then operates. At the cessation of the start-low signal, relay 512' operates, breaking the grounded circuit to the transmitter at contacts C and restoring the transmitter connections to normal. Also operation of relay 512' completes a number of circuits to energize the indicator clutch magnets as follows:

1. From battery through indicator clutch magnet 814, conductor 853, contacts H of relay 801, conductor 876, contacts B of relay 726 and thence over conductor 564 and 563 to grounded contacts B of relay 512'.

2. From battery through indicator clutch magnet 813, conductor 852, contacts G of relay 801, conductor 875, contacts B of relay 722 to conductor 454 which is grounded through the contacts of the integer counting relays as has been explained before.

3. From battery through indicator clutch magnet 818, conductor 857, contacts M of relay 801, conductor 880, contacts E of relay 601 (which was operated when the start-low signal was received), conductor 674, to conductor 876 which is grounded as was explained in (1) above.

4. From battery through indicator clutch magnet 817, conductor 856, contacts L of relay 801, conductor 879, contacts D of relay 601, conductor 673 to conductor 875, grounded as explained in (2) above.

The four indicator clutch magnets mentioned are operated and the indicator drums associated therewith are driven by the drive shafts to the new positions which are determined by the grounding of segments of commutators 712 and 713 in the same manner as was described in the posting of an open price. Subsequently, relays 609 and 610 are released and ground is removed from the various bus conductors of the board, restoring the circuits to their normal positions. At this time the prices posted are as follows: open 90⅝; high 99⅛; low 90⅜; and last 90⅜. Also the wipers of the rotary switches of the high shelf rest on contacts such that their combined record is 99⅛, while the switch arms of the low shelf rest on contacts making their combined record 90⅜.

*Automatic transmission and posting of a current price which is neither a "new high" nor a "new low"*

Let it be assumed that the next price for the stock considered, namely MMM, is 95⅞. The stock selection will proceed as has been previously described and the figure shift signal sent will become effective in the same manner as was described in the posting of a new high or a new low quotation. Following this, the price signals will be received and will cause the operation of relay 415 of the hundreds group which relay is associated with the numeral 5 (but is not shown on the drawings), and relay 511 of the fractions group (associated with the fraction ⅞). Circuits will then be completed in a manner similar to that described in connection with the posting of a high price to ground tap G of potentiometer 904 and tap F of potentiometer 903. Due to the grounding of these taps of the potentiometers, current will flow through the windings of relays 1003 and 1004 in such direction as to move these relay armatures to their contacts M, and current flows through windings of relays 1007 and 1008 in such a direction as to move their armatures to contacts S. Thus, no ground is applied to the conductors 1050 or 1051. The start signal is now transmitted and becomes effective to close the start circuit 4 of the permutation relay, since there has been no alternation of the start signal prior to its transmission. Reception of the start signal completes a circuit over conductor 550 and through the fractions pulsing relay 502 which operates, ultimately causing the operation of relay 512′ and the completion of the register indicator clutch magnet circuits. Since neither the high, low or open shelf relays 602, 601 and 603 respectively have been operated, circuits are not completed to the high, low or open shelf indicator clutch magnets, and consequently the only magnets operated will be those of the current shelf. The current shelf magnets 813 and 814 are energized and drums 829 and 830 associated therewith are driven by the corresponding shafts to their new positions, after which the relays 609 and 610 are released and circuits of the master board are restored to normal. The quotations now posted on the master board in the section assigned to stock MMM are: open 90⅝, high 99⅛, low 90⅜, and current 95⅞.

The foregoing has shown the operation of the master board by illustrative example. The receiving boards used with this system will now be described and the control exerted over them by the master board, explained.

*Receiving quotation board*

The receiving board used with the present system is similar to and operates in the same manner as the master board just described. In the preferable arrangement the receiving board does not, however, have the price comparing equipment, since the shelf selection circuits are operable in accordance with signals received from the central station transmitter, which signals have been altered prior to transmission in accordance with the price comparison at the master board. Consequently there need be no potentiometers or price altering relays at the receiving stations. Nor need the high and low shelves be equipped with rotary switches or the price selection circuits have potentiometer contacts.

While the arrangement described is preferable, it is easily seen that the system might employ no master board and yet include the automatic shelf selection feature at the receiving station. This would be accomplished by using at each station as a receiving board, the master board disclosed herein, omitting only the connections to the transmitter since, of course, there would be no need for them. In such case the receiving board at each receiving station would perform the price comparison function, control its own registers in accordance therewith, and light the indicating lamps to show the direction of a price change.

*Transmitting apparatus*

As was indicated previously, the signals from the transmitter are sent simultaneously to the receiving boards and the master board. This is accomplished by means of the master relay 104 and the transmitting relays 105 through 108 controlled thereby. The master relay receives the signal impulses from the transmitter through the transmitting distributor and operates in accordance therewith in the same manner as is disclosed in detail in the Clokey-Vernam application mentioned above.

One of the transmitting relays is connected by conductor 150 to relay 203 which is the receiving relay for the master board, while other relays as 107 and 108 are connected by lines as $L_1$ and $L_2$ (Fig. 1) to similar receiving relays at the remote stations. The transmitting relays operate in unison, consequently the signals are received simultaneously (neglecting line lag) at all the receiving stations. These signals cause selection of the proper shelves and predetermined indicators thereon, and then cause the selected quotation indicators to be positioned to post in a manner exactly similar to that described in connection with the master board.

*Complete system*

Figure 12 shows a schematic arrangement of a system using the master board and receiving boards described above. In this figure is shown the central station generally denoted 1201, connected over line wires 1252, 1253, 1254 to a plurality of receiving stations generally denoted 1215, 1216, 1217, 1218, 1219, 1220.

The central station 1201 includes the transmitting apparatus 1202, receiving apparatus 1203 connected by conductor 1250 thereto, and the master board 1204 controlled by the receiving apparatus; 1251 is the control circuit over which the master board controls the transmitting apparatus under certain conditions.

The receiving stations include receiving apparatus 1221, 1222, 1223, 1224, 1225 and 1226 (exactly similar to 1202) and receiving boards 1227, 1228, 1229, 1230, 1231 and 1232. Thus as the transmitting apparatus is operated, signals are sent to all the receiving stations as well as to the master board at the central station, and whenever the master board alters the condition of the transmitting apparatus the resulting altered signals are effective on both the master board and the receiving boards.

The above disclosure has been given by way of preference for purposes of description only, therefore no unnecessary limitations should be understood and the appended claims should be construed as broadly as the state of the art permits.

What is claimed is:

1. In a stock quotation system, a receiving board provided with an indicating mechanism for each stock, each mechanism having high and last shelves comprising a plurality of indicators and means settable by the indicators on the high shelf in accordance with a high price, a transmitter, selective means at said board controlled by said transmitter for storing impulses, in accordance with a predetermined quotation, to be subsequently utilized in setting the indicators on the last shelf of a particular indicating mechanism to display said quotation, price comparison means for comparing the settings of said settable means and said selective means to determine whether said predetermined quotation is a new high, means on said transmitter operable under control of said price comparison means, in response to the condition that said predetermined signal is a new high, for transmitting a high shelf selecting signal, and additional selective means at said board operable in response to said high shelf selecting signals to prepare the indicators on the high shelf of the particular mechanism to post said predetermined quotation.

2. In a stock quotation system, a receiving board provided with an indicating mechanism for each stock, each mechanism having low and last shelves comprising a plurality of indicators and means settable by the indicators on the low shelf in accordance with a low price, a transmitter, selective means at said board controlled by said transmitter for storing impulses, in accordance with a predetermined quotation, to be subsequently utilized in setting the indicators on the last shelf of a particular indicating mechanism to display said quotation, price comparison means for comparing the settings of said settable means and said selective means to determine whether said predetermined quotation is a new low, means at said transmitter operable under control of said price comparison means, in response to the condition that said predetermined signal is a new low, for transmitting a low shelf selecting signal, and additional selective means at said board operable in response to said low shelf selecting signals to prepare indicators on the low shelf of the particular mechanism to post said predetermined quotation.

3. In a stock quotation system, a receiving board provided with an indicating mechanism for each stock, each mechanism having high, low and last shelves comprising a plurality of indicators, a transmitter, selective means at said board controlled by said transmitter for preparing selected indicators on the last shelf of a particular mechanism to post a predetermined quotation, a start signal normally sent by said transmitter to cause the setting of the selected indicators, and means at said transmitter for changing said start signal into a high shelf selection signal in response to the condition that said predetermined quotation is a new high and into a low shelf selection signal when said predetermined quotation is a new low for setting said high and low shelves, respectively, in accordance with the quotation.

4. In a stock quotation system, a receiving board provided with an indicating mechanism for each stock, each mechanism having high, low and last shelves comprising a plurality of indicators, means settable by the indicators on the high shelf in accordance with a high price and means settable by the indicators on the low shelf in accordance with a low price, a transmitter, selective means at said board controlled by said transmitter for storing, in accordance with a predetermined price, impulses to be subsequently utilized in setting the indicators on the last shelf of a particular indicating mechanism to display said price, price comparison means for comparing the settings of each of said high and low settable means with the impulses stored by said selective means to determine when said predetermined price is a new high and when said predetermined price is a new low, high shelf selection means and low shelf selection means at said board, means at said transmitter operable under control of said price comparison means in response to the condition that said predetermined signal is a new high or a new low for transmitting high shelf selecting and low shelf selecting signals, said high shelf selection means being operable under control of said high selective signal to prepare the indicators on the high shelf of a particular mechanism to post said predetermined price, and said low shelf selection means being operable under control of said low selective signal to prepare the indicators on the low shelf of a particular mechanism to post said predetermined price.

5. In a stock quotation system, a receiving board provided with an indicating mechanism for each stock, each mechanism having high, low and last shelves comprising a plurality of indicators for indicating the several orders of digits and the fractions of the price, means settable by the indicators on the high shelf according to a high price and means settable by the indicators on the low shelf according to the low price, a transmitter, selective means at the board controlled by said transmitter for storing, in accordance with a predetermined price, impulses to be subsequently utilized in setting the indicators on the last shelf of a particular indicating mechanism to post said price, price comparison means for comparing the settings of each of the high and low settable means with the impulses stored by said price selective means, high and low shelf selection means for preparing the indicators on the high shelf and low shelf, respectively, to post said predetermined price, and means whereby said price comparison means causes said transmitter to transmit signals for controlling said high shelf selective means when the highest order of said predetermined price exceeds the corresponding order of the previous high price, and to transmitter signals for controlling the low shelf selection means when the highest order of the predetermined price is lower than the corresponding order of the previous low price.

6. In an automatic stock quotation board, in combination, a transmitter for controlling the posting of a high quotation on certain of the indicators on said board and posting of a low quotation on certain other indicators on said board, price comparing means corresponding to each order of the digits and to the fractions of the price, a group of price selection relays likewise corresponding to each order of the digits and to the fraction of the price, means responsive to signals from said transmitter for operating said price selection relays in accordance with a partial price and for causing the price selection relay groups corresponding to the two high orders of the price to control the price comparing means corresponding to the digits in the lower orders of the price as well as to control the price comparing means corresponding to the digits in the same order of the price, said price comparing means being thereafter effective to compare the operated price selection relays with the previous setting of the high and low indicators on the board, and means controlled by said price comparing means when the price corresponding to the operated price selection relays is higher than the previous high price to cause said transmitter to transmit automatically a high shelf selection signal and to cause said transmitter automatically to transmit a low shelf selection signal when the price indicated by the operated price selection relays is lower than the previous low price.

7. In a stock quotation system, a quotation board provided with an indicating mechanism for each stock, each mechanism having high and last shelves including indicators settable in accordance, respectively, with a high and a last price, and means, settable by the indicators on said high shelf according to the high price, a transmitter, selective means controlled by said transmitter, comprising stock selective means for selecting a predetermined indicating mechanism on said board, and price selective means for storing impulses corresponding to a price, price comparison means, means responsive to the actuation of said price selective means in accordance with a new price for operatively associating predetermined settable means of the selected indicating mechanism with said price comparison means, and means whereby said price comparison means then compares the settings corresponding to the high price represented by said predetermined settable means with the stored impulses corresponding to the new price to determine whether said new price is high.

8. In a stock quotation system, a quotation board provided with an indicating mechanism for each stock, each mechanism having low and last shelves including indicators settable in accordance, respectively, with a low and a last price, and means, settable by the indicators on said low shelf, according to the low price, a transmitter, selective means controlled by said transmitter, comprising stock selective means for selecting a predetermined indicating mechanism on said board, and price selective means for storing impulses corresponding to a price, price comparison means, means responsive to the actuation of said price selective means in accordance with a new price for operatively associating predetermined settable means of the selected indicating mechanism with said price comparison means, and means whereby said price comparison means then compares the settings corresponding to the low price represented by said predetermined settable means with the stored impulses corresponding to the new price to determine whether said new price is low.

9. In a stock quotation system, a quotation board provided with an indicating mechanism for each stock, each mechanism having high and last shelves including indicators settable in accordance, respectively, with a high and a last price, and means individual to the indicators on said high shelf settable by the indicator individual thereto according to a high price, a transmitter, selective means controlled by said transmitter, comprising stock selective means for selecting a predetermined indicating mechanism on said board, and price selective means for storing impulses corresponding to a price, price comparison means common to the indicating mechanisms on said board, means responsive to the actuation of said price selective means in accordance with a new price for operatively associating predetermined settable means of the selected indicating mechanism with said price comparison means, and means whereby said price comparison means then compares the settings corresponding to that portion of the high price represented by said predetermined settable means with the stored impulses corresponding to the new price to determine whether said new price is high.

10. In a stock quotation system, a quotation board provided with an indicating mechanism for each stock, each mechanism having low and last shelves including indicators settable in accordance, respectively, with a low and a last price, and means individual to the indicators on said low shelf settable by the indicator individual thereto according to a low price, a transmitter, selective means controlled by said transmitter, comprising stock selective means for selecting a predetermined indicating mechanism on said board, and price selective means for storing impulses corresponding to a price, price comparison means common to the indicating mechanisms on said board, means responsive to the actuation of said price selective means in accordance with a new price for operatively associating predetermined settable means of the selected indicating mechanism with said price comparison means, and means whereby said price comparison means then compares the settings representing the low price with the stored impulses corresponding to the new price to determine whether said new price is low.

11. In a stock quotation system, a quotation board provided with an indicating mechanism for each stock, each mechanism having a plurality of indicators settable in accordance with a price, and means settable by said indicators according to the price indicated by said indicators, a transmitter, selective means controlled by said transmitter, comprising stock selective means for selecting a predetermined indicating mechanism on said board, and price selective means for storing impulses corresponding to a price, price comparison means, means responsive to the actuation of said price selective means in accordance with a new price for operatively associating predetermined settable means of the selected indicating mechanism with said price comparison means, and means whereby said price comparison means then compares the settings representing the price indicated by the selected indicating mechanism with the stored impulses corresponding to the new price to determine when said new price is high.

12. In a stock quotation system, a quotation board provided with an indicating mechanism for each stock, each mechanism having a plurality of indicators settable in accordance with a price, and means settable by said indicators according to the price indicated by said indicators, a transmitter, selective means controlled by said transmitter, comprising stock selective means for selecting a predetermined indicating mechanism on said board, and price selective means for storing impulses corresponding to a price, price comparison means, means responsive to the actuation of said price selective means in accordance with a new price for operatively associating predetermined settable means of the selected indicating mechanism with said price comparison means, and means whereby said price comparison means then compares the settings representing the price indicated by the selected indicating mechanism with the stored impulses corresponding to the new price to determine when said new price is low.

13. In a stock quotation system, a quotation board provided with an indicating mechanism for each stock, each mechanism having high, low and last shelves including indicators settable in accordance, respectively, with high, low and last prices, means settable by the indicators on said high shelf and other means settable by the indicators on said low shelf, for according to the high and low prices, respectively, a transmitter, selective means controlled by said transmitter, comprising stock selective means for selecting a predetermined indicating mechanism on said board, and price selective means for storing impulses corresponding to a price, price comparison means, means responsive to the actuation of said price selective means in accordance with a new price for operatively associating predetermined high and low price settable means of the selected indicating mechanism with said price comparison means, and means whereby said price comparison means then compares the settings corresponding to the high and low prices represented by said predetermined settable means with the stored impulses corresponding to the new price to determine whether said new price is high or low.

14. In a stock quotation system, a quotation board provided with an indicating mechanism for each stock, each mechanism having high, low and last shelves including indicators settable in accordance, respectively, with high, low and last prices, means individual to the indicators on said high and low shelves settable by the indicator individual thereto according to the high and low prices respectively, a transmitter, selective means controlled by said transmitter, comprising stock selective means for selecting a predetermined indicating mechanism on said board, and price selective means for storing impulses corresponding to a price, price comparison means, means responsive to the actuation of said price selective means in accordance with a new price for operatively associating with said price comparison means predetermined settable means associated with the indicators on the high and low shelves of the selected indicating mechanism, and means whereby said price comparison means then compares the settings corresponding to the portion of the high and low prices represented by said predetermined settable means with the stored impulses corresponding to the new price to determine whether said new price is high or low.

15. In a stock quotation system, a quotation board provided with an indicating mechanism for each stock, each mechanism having high, low and last shelves including indicators settable in accordance, respectively, with high, low and last prices, means individual to the indicators on said high and low shelves settable by the indicator individual thereto according to the high and low prices respectively, a transmitter, selective means controlled by said transmitter comprising stock selective means for selecting a predetermined indicating mechanism on said board, and price selective means for storing impulses corresponding to a price, price comparison means, means responsive to the actuation of said price selective means in accordance with a new price for operatively associating with said price comparison means predetermined settable means associated with the indicators on the high and low shelves of the selected indicating mechanism, said comparison means comprising relay means for comparing the settings corresponding to that portion of the high price represented by the settable means associated with the indicators on the high shelf of the selected mechanism to determine whether the new price is also a new high, and other relay means for comparing the settings corresponding to that portion of the low price represented by the selected settable means associated with the indicators on the low shelf of said mechanism to determine whether the new price is also a new low.

16. In a stock quotation system, a board having an indicating mechanism for each stock, each mechanism having high and last shelves including indicators settable in accordance with a high and a last price, respectively, and switching means settable by the indicators on the high shelf in accordance with the high price, a high shelf selecting relay and a price comparison means for each indicator on any high shelf of the board, a transmitter, selective means controlled by said transmitter, comprising stock selective means for selecting a predetermined indicating mechanism, and price selective means for storing impulses corresponding to a new price and for selecting predetermined and corresponding high shelf selection relays, price comparison means and switching means in the selected indicating mechanism, and means whereby said comparison means compares the settings corresponding to the high price with the stored impulses corresponding to the new price, impulse by impulse, and operates the selected shelf selection relays in accordance with the results of said comparisons.

17. In a stock quotation system, a receiving board provided with a stock indicator group comprising separate indicators for displaying low and last prices, mechanism for transmitting to said board signals representing a current quotation, means settable in accordance with said current quotation, price comparison means rendered effective upon the setting of said settable means whenever the current quotation differs from that posted on the last indicator for comparing the setting of said settable means with that of the low price indicator, means responsive to said signals to select and set the last price indicator to display said current quotation, and additional selective means at said board operable by signals transmitted by said mechanism under control of said price comparison means when said current quotation is lower than that displayed by said low price indicator to alter the setting thereof to display said current quotation as a new low.

18. In a stock quotation system, a receiving board provided with a stock indicator group comprising separate indicators for displaying high and last prices, each indicator having separate digital and fractional display elements and setting mechanism therefor, means for transmitting to said board signals representing a current quotation, means settable in accordance with said current quotation, price comparison means rendered effective upon the setting of said settable means whenever the current quotation differs from that posted on the last indicator for comparing the setting of said settable means with that of the high price indicator, means responsive to said signals to select and set the last price indicator to display said current quotation, and means rendered effective by said price comparison means when the current quotation is a new high to cause said mechanism to transmit a current impulse to said board thereby to operate said indicator setting mechanism to alter the setting of said high price indicator to display said current quotation as a new high.

19. In a stock quotation system, a receiving board provided with a plurality of stock indicator groups, each group comprising indicators for low and last prices and each indicator having separate digital and fractional price display elements and setting mechanism therefor, means for transmitting to said board signals representing a current quotation for a given stock, means settable in accordance with said current quotation, price comparison means rendered effective upon the setting of said settable means when said current quotation differs from that previously posted on the last indicator for comparing the setting of said settable means with that of the low price indicator of the given stock indicator group, means responsive to said signals to select and set the last price indicator of the group individual to said given stock thereby to display said current quotation, and electromagnetic means responsive to the operation of the said price comparison means when the current quotation is a new low for rendering the transmitter effective to transmit the signal to cause the setting mechanism to alter the setting of the low indicator of the given indicator group thereby to display the current quotation as a new low.

20. A stock quotation board system having a receiving board provided with a plurality of indicator groups, each group comprising indicators for high, low and last prices and each indicator having separate digital and fractional price display elements and setting mechanism therefor, means including a transmitter and a signaling channel for transmitting signals to said receiving board, means at said board responsive to at least a portion of said signals for selecting and setting the last-price indicators to tabularly display current quotations, price comparison means for determining instances when a current quotation constitutes a new high or a new low quotation for a given stock, said price comparison means being operable in accordance with the fluctuating relationships from time to time existing between a previously posted high or low quotation and a quotation about to be posted, and means responsive to the functioning of said price comparison means for controlling the initiation at the transmitter of certain signals having significance such as to control the selection of the high-indicator when the price about to be posted is a new high and to control the selection of the low indicator when the price about to be posted is a new low.

CLIFTON T. FOSS.